United States Patent
Kita et al.

(10) Patent No.: US 11,978,924 B2
(45) Date of Patent: May 7, 2024

(54) POWER SUPPLY DEVICE, ELECTRIC VEHICLE COMPRISING POWER SUPPLY DEVICE, AND POWER STORAGE DEVICE

(71) Applicant: SANYO Electric Co., Ltd., Osaka (JP)

(72) Inventors: Hiroaki Kita, Osaka (JP); Takashi Inamura, Hyogo (JP); Yasumasa Kojima, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 277 days.

(21) Appl. No.: 17/438,519

(22) PCT Filed: Aug. 26, 2019

(86) PCT No.: PCT/JP2019/033263
§ 371 (c)(1),
(2) Date: Sep. 13, 2021

(87) PCT Pub. No.: WO2020/194783
PCT Pub. Date: Oct. 1, 2020

(65) Prior Publication Data
US 2022/0131236 A1    Apr. 28, 2022

(30) Foreign Application Priority Data

Mar. 27, 2019   (JP) ................................ 2019-060107

(51) Int. Cl.
*H01M 50/505*     (2021.01)
*B60L 50/51*      (2019.01)
(Continued)

(52) U.S. Cl.
CPC ........... *H01M 50/505* (2021.01); *B60L 50/51* (2019.02); *B60L 50/60* (2019.02);
(Continued)

(58) Field of Classification Search
CPC ............... H01M 50/505; H01M 50/50; H01M 10/0525; H01M 50/209; H01M 2220/20;
(Continued)

(56) References Cited

U.S. PATENT DOCUMENTS

2012/0231638 A1* 9/2012 Ikeda .................. H01M 50/502
                                                  439/77
2015/0243947 A1* 8/2015 Seto ..................... H01M 50/522
                                                  429/158
(Continued)

FOREIGN PATENT DOCUMENTS

CN        108899465 A        11/2018
JP        2010-257735        11/2010
(Continued)

OTHER PUBLICATIONS

International Search Report of PCT application No. PCT/JP2019/033263 dated Nov. 26, 2019.
(Continued)

*Primary Examiner* — Jared Fureman
*Assistant Examiner* — Duc M Pham
(74) *Attorney, Agent, or Firm* — WHDA, LLP

(57) ABSTRACT

A power supply device including a plurality of battery cells electrically connected with each other by bus bar. The power supply device has a structure where bus bar includes: rod having conductivity and extending in an arrangement direction of the battery cells; and arm being elastically deformable and being connected to rod, arm is configured such that distal end of arm is welded to an electrode terminal of the battery cell, and rear end of arm is connected to rod so as to electrically connect the plurality of battery cells to each other via the rod, arm is formed of a conductive plate that is elastically deformable, deformation gap extending from rear end toward a distal end is formed between arm and rod, and
(Continued)

arm is elastically deformable so as to displace distal end to be welded to the electrode terminal.

17 Claims, 16 Drawing Sheets

(51) Int. Cl.
*B60L 50/60* (2019.01)
*H01M 10/0525* (2010.01)
*H01M 10/42* (2006.01)
*H01M 50/209* (2021.01)
*H01M 50/249* (2021.01)
*H01M 50/293* (2021.01)
*H01M 50/50* (2021.01)
*H01M 50/503* (2021.01)
*H02J 7/00* (2006.01)

(52) U.S. Cl.
CPC ... *H01M 10/0525* (2013.01); *H01M 10/4207* (2013.01); *H01M 10/425* (2013.01); *H01M 50/249* (2021.01); *H01M 50/50* (2021.01); *H01M 50/503* (2021.01); *H02J 7/0013* (2013.01); *H02J 7/0042* (2013.01); *H02J 7/0063* (2013.01); *B60L 2210/40* (2013.01); *H01M 50/209* (2021.01); *H01M 50/293* (2021.01); *H01M 2220/20* (2013.01)

(58) Field of Classification Search
CPC .... B60L 50/60; B60L 2210/40; H02J 7/0042; H02J 7/0063
See application file for complete search history.

(56) References Cited

U.S. PATENT DOCUMENTS

2018/0090735 A1 3/2018 Huff et al.
2020/0106075 A1 4/2020 Yanagida

FOREIGN PATENT DOCUMENTS

| JP | 2011-228216 | 11/2011 | |
| JP | 2015-023003 | 2/2015 | |
| JP | 2016-213026 | 12/2016 | |
| WO | 2014/064888 | 5/2014 | |
| WO | 2018/116822 | 6/2018 | |
| WO | WO-2019074206 A1 * | 4/2019 | ............ H01M 50/20 |

OTHER PUBLICATIONS

Extended (Supplementary) European Search Report dated Jun. 7, 2022, issued in counterpart EP application No. 19921386.9. (7 pages).

* cited by examiner

POWER SUPPLY DEVICE, ELECTRIC VEHICLE COMPRISING POWER SUPPLY DEVICE, AND POWER STORAGE DEVICE

CROSS-REFERENCE TO RELATED APPLICATIONS

This application is a U.S. national stage application of the PCT International Application No. PCT/JP2019/033263 filed on Aug. 26, 2019, which claims the benefit of foreign priority of Japanese patent application No. 2019-060107 filed on Mar. 27, 2019, the contents all of which are incorporated herein by reference.

TECHNICAL FIELD

The present invention relates to a power supply device in which a plurality of battery cells are electrically connected to each other by bus bars, an electric vehicle that includes such a power supply device, and a power storage device.

BACKGROUND ART

An output or a capacity of a power supply device can be increased by increasing a number of battery cells connected to each other. In view of the above circumstance, with respect to a power supply device used for an application that requires a large output, for example, a power supply for an electric vehicle such as a hybrid car or an electric car, an uninterruptible power supply for a server, or the like, an output or a capacity of the power supply device is increased by connecting a large number of battery cells in series or in parallel. In this type of power supply device, a large number of battery cells are stacked to form a battery stack, and the battery cells disposed adjacently to each other are electrically connected to each other by bus bars each made of a metal plate. A power supply device including a plurality of battery cells is described in the following Patent Literature (see PTL 1).

CITATION LIST

Patent Literature

PTL 1: Unexamined Japanese Patent Publication No. 2016-213026

SUMMARY OF THE INVENTION

Technical Problems

In the power supply device described in this Patent Literature, a plurality of battery cells are electrically connected to each other by bus bars. In a power supply device where battery cells are electrically connected to each other via bus bars, the bus bar made of a metal plate is stacked on electrode terminals of the battery cells, and stacked portions of the bus bar are welded to the electrode terminals of the battery cells. With such a configuration, the battery cells can be connected to each other with small electric resistance. In this power supply device, the relative positional deviation between the bus bar and the electrode terminal hinders reliable welding. In a power supply device in which a large number of battery cells are assembled into a battery stack and bus bars are welded to the respective battery cells that form the battery stack, it is difficult to arrange the electrode terminals of all battery cells at accurate positions. This is because a dimensional error occurs in the battery cell in an assembling step of the battery cell, and this dimensional error causes a relative positional deviation between the electrode terminals and the bus bar. In a power supply device in which a bus bar and an electrode terminal are welded to each other, it is important to bring the bus bar and the electrode terminal into close contact with each other without forming a gap between the bus bar and the electrode terminal during welding. This is because, at the time of welding, the presence of the gap hinders reliable welding. Further, a thick metal plate having small electric resistance is used for forming the bus bar. However, along with a demand for a larger current, it is necessary to increase a cross-sectional area of the bus bar to suppress the generation of heat so as to prevent fusing of the bus bar and hence, it is necessary to increase a thickness of the bus bar. However, the increase of the thickness of the bus bar makes it difficult to weld the bus bar and the electrode terminal to each other with certainty when relative positional deviation exists.

Accordingly, the present invention has been made to overcome such drawbacks, and it is an object of the present invention to provide a power supply device where a bus bar and an electrode terminal are brought into close contact with each other without forming a gap between the bus bar and the electrode terminal so that the bus bar and the electrode terminal can be welded to each other with certainty, an electric vehicle which includes such a power supply device, and a power storage device which includes such a power supply device.

A power supply device according to the present invention is a power supply device in which a plurality of battery cells 1 are electrically connected to each other by bus bar 3. Bus bar 3 includes: rod portion 4 having conductivity and extending in an arrangement direction of battery cells 1; and arm portion 5 being elastically deformable and being connected to rod portion 4, arm portion 5 is configured such that distal end portion 5x of arm portion 5 is welded to electrode terminal 2 of battery cell 1, and rear end portion 5y of arm portion 5 is connected to rod portion 4 so as to electrically connect the plurality of battery cells 1 to each other via rod portion 4, arm portion 5 is formed of a conductive plate that is elastically deformable, deformation gap 6 extending from rear end portion 5y toward a distal end is formed between arm portion 5 and rod portion 4, and arm portion 5 is elastically deformable so as to displace distal end portion 5x to be welded to electrode terminal 2.

An electric vehicle that includes the power supply device having the above-mentioned constituent elements includes: power supply device 100; motor 93 for traveling to which power is supplied from power supply device 100; vehicle body 91 on which power supply device 100 and motor 93 are mounted; and wheels 97 driven by motor 93 so as to allow vehicle body 91 to travel.

Further, a power storage device including the power supply device having the above-mentioned constituent elements includes: power supply device 100; and power supply controller 88 that controls charging and discharging of power supply device 100. Power supply controller 88 performs a control so as to enable charging of battery cell 1 by power from an outside and a control of charging battery cell 1.

According to the above-mentioned configuration, the present invention can acquire an advantageous effect that the bus bar and the electrode terminal are brought into close contact with each other in a stacked state without forming a gap between the bus bar and the electrode terminal, and the bus bar and the electrode terminal can be welded to each other with certainty.

DESCRIPTION OF EMBODIMENT

Figure 1:
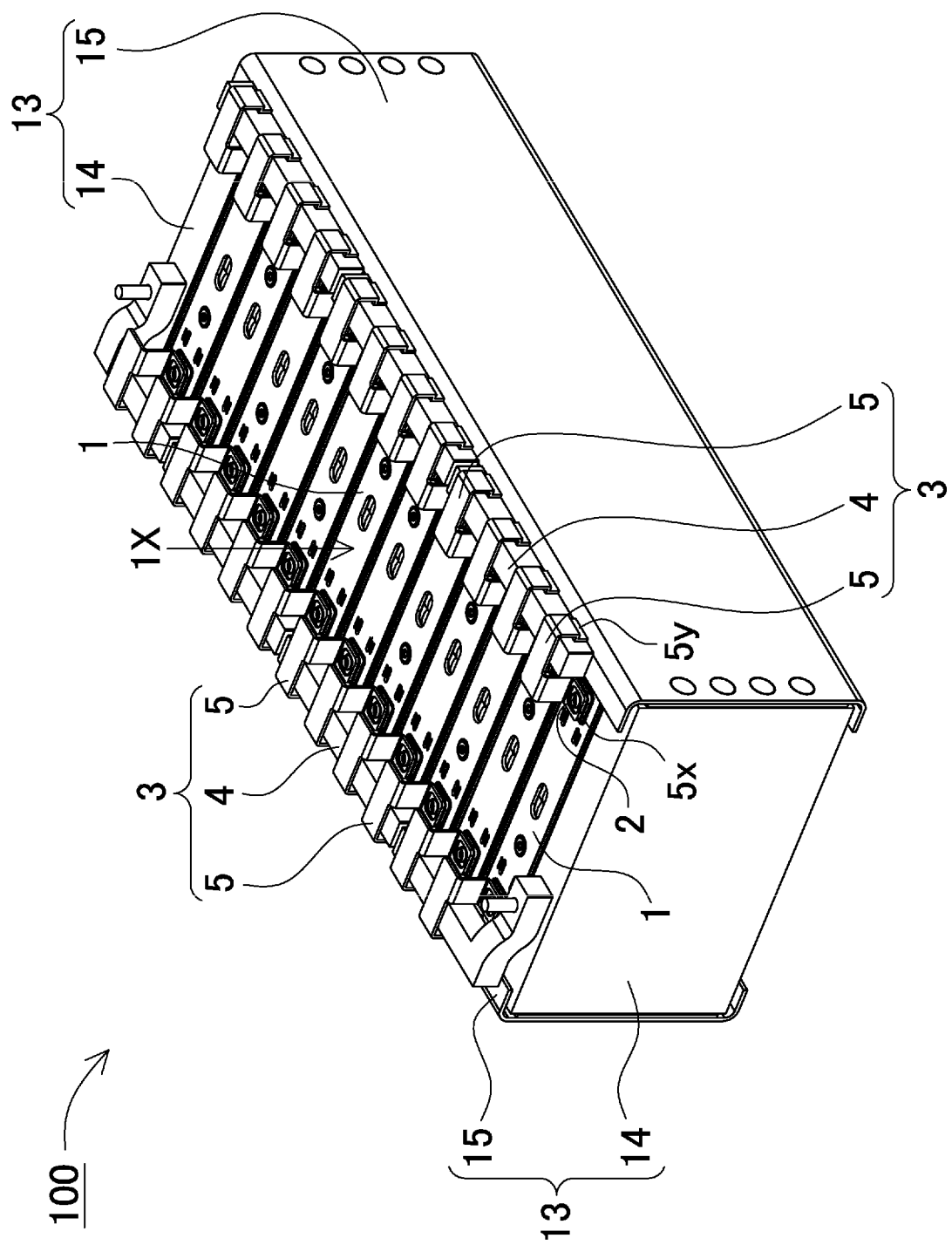
FIG. 1 is a schematic perspective view of a power supply device according to one exemplary embodiment of the present invention.

First, a process that inventors of the present invention have reached an exemplary embodiment according to the present invention is described. In a power supply device including a large number of battery cells, the relative positional deviation between battery cells and bus bars that electrically connect these battery cells to each other causes a problem, in some cases. In particular, since dimensional irregularities exist among the battery cells due to manufacturing tolerance, it is impossible to completely eliminate relative positional deviation at a connecting portion between the bus bar and the electrode terminal. In particular, in a connection structure in which a bus bar is stacked on and is welded to an electrode terminal, it is difficult to weld with certainty when a gap is formed during a stacking operation. In particular, a bus bar in which arm portions are fixed to a rod portion has a technical feature that electric resistance of the bus bar can be reduced by the rod portion. Further, the bus bar has a technical feature that a cross-sectional area of the bus bar can be increased by the rod portion into which a current flows from a plurality of arm portions so that a large current flows into the rod portion. However, the bus bar is less likely to be elastically deformed as compared with a bus bar that is formed of a single metal plate as a whole. Accordingly, there is a drawback that a connection failure occurs due to the positional deviation between the bus bar and the electrode terminal. In addition, in a state after the bus bar and the electrode terminal are welded to each other, there is a problem that a welding portion is easily detached due to an impact or vibrations compared with the bus bar formed of a single metal plate.

To cope with such problems, the inventors of the present invention have found that welding between a bus bar and an electrode terminal can be performed with certainty by reducing a gap between the bus bar and the electrode terminal while using a low-resistance bus bar that is formed by connecting arm portions to a rod portion, and have reached the present invention.

A power supply device according to a first aspect of the present invention is a power supply device in which a plurality of battery cells are electrically connected to each other by a bus bar, wherein the power supply device includes a structure where the bus bar includes: a rod portion having conductivity and extending in an arrangement direction of the battery cells; and an arm portion being elastically deformable and being connected to the rod portion, the arm portion is configured such that a distal end portion of the arm portion is welded to an electrode terminal of the battery cell, and a rear end portion of the arm portion is connected to the rod portion so as to electrically connect the plurality of battery cells to each other via the rod portion, the arm portion is formed of a conductive plate that is elastically deformable, a deformation gap extending from the rear end portion toward a distal end is formed between the arm portion and the rod portion, and the arm portion is elastically deformable so as to displace the distal end portion to be welded to the electrode terminal.

The bus bar of the power supply device described above has the structure where the plurality of elastically deformable arm portions are connected to the rod portion. The rear end portion of the arm portion is connected to the rod portion and the distal end portion of the arm portion is welded to the electrode terminal. Furthermore, the deformation gap is formed between the arm portion and the rod portion close to the distal end rather than the rear end portion of the arm portion so that a region where the arm portion is elastically deformed is extended. Therefore, the arm portion is easily elastically deformed so that the distal end portion is allowed to move to an ideal position for the connection of the arm portion with the electrode terminal. The arm portion that is smoothly elastically deformed and can move the distal end portion to an ideal position without difficulty is characterized in that the arm portion is moved to an ideal position with respect to the electrode terminal that is positionally deviated due to an error in a manufacturing process or the like, and the distal end portion is brought into close contact with the electrode terminal and can be welded to the electrode terminal with certainty. In particular, the deformation gap is formed between the arm portion and the rod portion to which the rear end portion of the arm portion is connected. Accordingly, a length of an elastic deformation region of the arm portion is increased while reducing an amount of protrusion of the arm portion from the rod portion so that it is possible to make the distal end portion approach the electrode terminal without difficulty. Furthermore, it is possible to make the distal end portion approach the electrode terminal by elastically deforming the long arm portion. Accordingly, a change in posture of the arm portion in a state where the distal end portion is made to approach the electrode terminal can be reduced so that the distal end portion is moved to an ideal position in an ideal posture with respect to the electrode terminal. Then, after the distal end portion is mounted on the electrode terminal, the distal end portion is elastically deformed by applying a load to an upper surface of the bus bar. Accordingly, a gap between the arm portion and the electrode terminal can be easily eliminated so that welding can be performed with certainty.

In the power supply device according to a second aspect of the present invention, the distal end portion of the arm portion is stacked on and welded to the electrode terminal.

In the power supply device according to a third aspect of the present invention, the deformation gap is formed between the arm portion and the rod portion so as to allow displacement of the distal end portion of the arm portion in a vertical direction.

In the power supply device according to a fourth aspect of the present invention, the deformation gap is formed between the arm portion and the rod portion so as to allow displacement of the distal end portion of the arm portion in a horizontal direction.

In the power supply device according to a fifth aspect of the present invention, the rear end portion of the arm portion is connected to a side surface of the rod portion that is a side surface opposite to the electrode terminal, and the deformation gap is formed between the arm portion and the rod portion.

In the power supply device according to a sixth aspect of the present invention, a rod portion has a polygonal columnar shape or a circular columnar shape.

In the power supply device according to a seventh aspect of the present invention, the rod portion has a columnar shape having a vertical surface, and the rear end portion of the arm portion is connected to the vertical surface of the rod portion, and the deformation gap is formed between the arm portion and the vertical surface of the rod portion.

In the power supply device according to an eighth aspect of the present invention, the rod portion has a quadrangular columnar shape having a vertical surface and a horizontal surface, and the arm portion has a shape extending along from a horizontal surface to a vertical surface of the rod portion, and a rear end portion of the arm portion is connected to the vertical surface of the rod portion, and the deformation gap is formed between the arm portion and a horizontal portion of the rod portion.

In a power supply device according to a ninth aspect of the present invention, the rod portion is a columnar metal rod, and a rear end portion of the arm portion is welded and fixed to the rod portion.

In the power supply device according to a tenth aspect of the present invention, the rod portion is formed by winding and stacking a metal plate in a spiral shape, and the arm portion is integrally connected to the metal plate.

In the power supply device according to an eleventh aspect of the present invention, the rod portion includes: a cylindrical portion formed by bending a metal plate in a hollow columnar shape; and a columnar portion inserted into the cylindrical portion, and the arm portion is integrally connected to the metal plate.

In the power supply device according to a twelfth aspect of the present invention, in a developed state, the metal plate is cut into a shape where the metal plate includes: a quadrangular region scheduled to form the rod portion and having a quadrangular profile; and a plurality of arm portions protruding from one side edge of the quadrangular region.

A power supply device according to a thirteenth aspect of the present invention, the battery cell is a quadrangular battery where an opening portion of an exterior can is closed by a sealing plate, and a plurality of the battery cells are stacked to form a battery stack, positive and negative electrode terminals are disposed on the sealing plate, a pair of the rod portions is disposed outside the positive electrode terminal and the negative electrode terminal, the pair of rod portions is disposed on an upper surface of the sealing plate in a state where the pair of rod portions extends in the arrangement direction of the battery cells, and the arm portion extends from the rod portion to the electrode terminal, and the distal end portion is welded to the electrode terminal.

In a power supply device according to a fourteenth aspect of the present invention, the arm portion includes: a connecting arm portion disposed on a side surface of the rod portion and having the rear end portion that is connected to the rod portion; a horizontal arm portion connected to an upper end of the connecting arm portion and extending toward a distal end over an upper surface of the rod portion; a vertical arm portion having a plate shape and connected to a side edge of the horizontal arm portion; and a welding portion connected to the vertical arm portion in a horizontal posture, and the welding portion is welded to the electrode terminal in a stacked state.

In a power supply device according to a fifteenth aspect of the present invention, the arm portion includes: a connecting arm portion disposed on a side surface of the rod portion and having the rear end portion that is connected to the rod portion; a horizontal arm portion connected to an upper end of the connecting arm portion and extending toward a distal end over an upper surface of the rod portion; a vertical arm portion having a plate shape and connected to a distal end edge of the horizontal arm portion; and a welding portion connected to the vertical arm portion in a horizontal posture, and the welding portion is welded to the electrode terminal in a stacked state.

An electric vehicle including a power supply device according to a sixteenth aspect of the present invention includes the power supply device according to any one of the above-mentioned aspects, a motor for traveling to which power is supplied from the power supply device; a vehicle body on which the power supply device and the motor are mounted; and wheels that are driven by the motor to allow the vehicle body to travel.

A power storage device including a power supply device according to a seventeenth aspect of the present invention includes the power supply device according to any one of the above-mentioned aspects; and a power supply controller that controls charging and discharging of the power supply device, wherein the power supply controller performs a control so as to enable charging of the battery cell by power from an outside and a control so as to charge the battery cell.

Hereinafter, an exemplary embodiment of the present invention are described in detail with reference to the drawings. In the following description, terms that indicate specific directions and positions (for example, "upper", "lower" and other terms including those terms) are used when necessary. However, these terms are used to facilitate understanding of the invention with reference to the drawings and hence, the technical scope of the present invention is not limited by the meanings of these terms. Parts denoted by the same reference numerals in a plurality of drawings indicate the identical or equivalent parts or members. Further, the following exemplary embodiment illustrates specific examples of the technical concept of the present invention, and the present invention is not limited by the following exemplary embodiment. In addition, unless otherwise specified, dimensions, materials, shapes, relative arrangements, and the like of the constituent elements described below are not intended to limit the scope of the present invention, but are intended to be illustrative. The contents described in one exemplary embodiment and one example are also applicable to other exemplary embodiments and examples. In addition, sizes, positional relationships, and the like of members illustrated in the drawings may be exaggerated for the sake of clarity of description.

The power supply device according to the exemplary embodiment is used for various applications such as a power supply that is mounted on an electric vehicle such as a hybrid car or an electric car and supplies power to a motor for traveling, a power supply that stores power generated by the use of natural energy such as solar power generation or wind power generation, and a power supply that stores midnight power. The power supply device according to the exemplary embodiment is particularly used as a power supply suitable for applications which require a large power or a large current.

First Exemplary Embodiment

Figure 2:
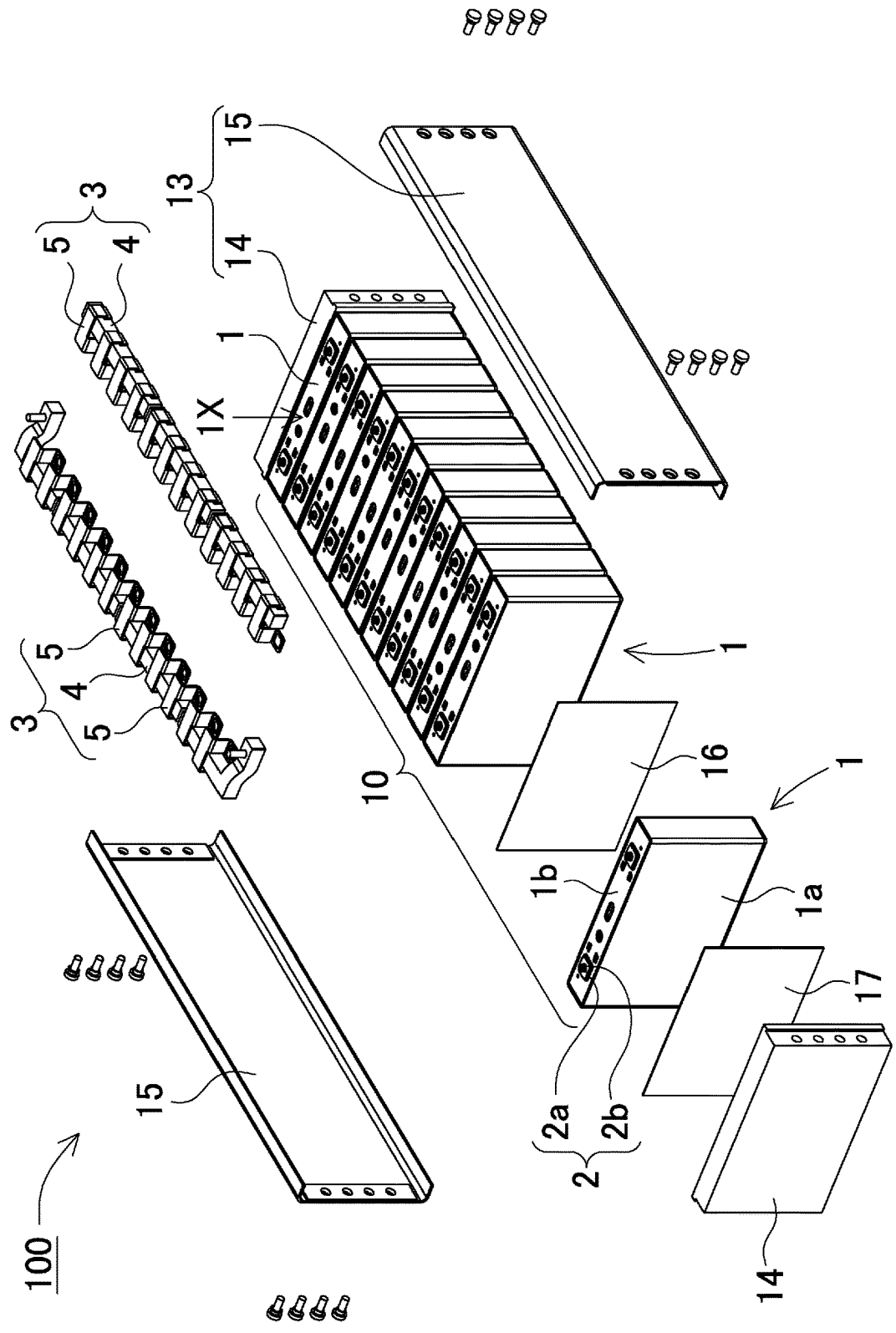
FIG. 2 is an exploded perspective view of the power supply device illustrated in FIG. 1.
Figure 3:
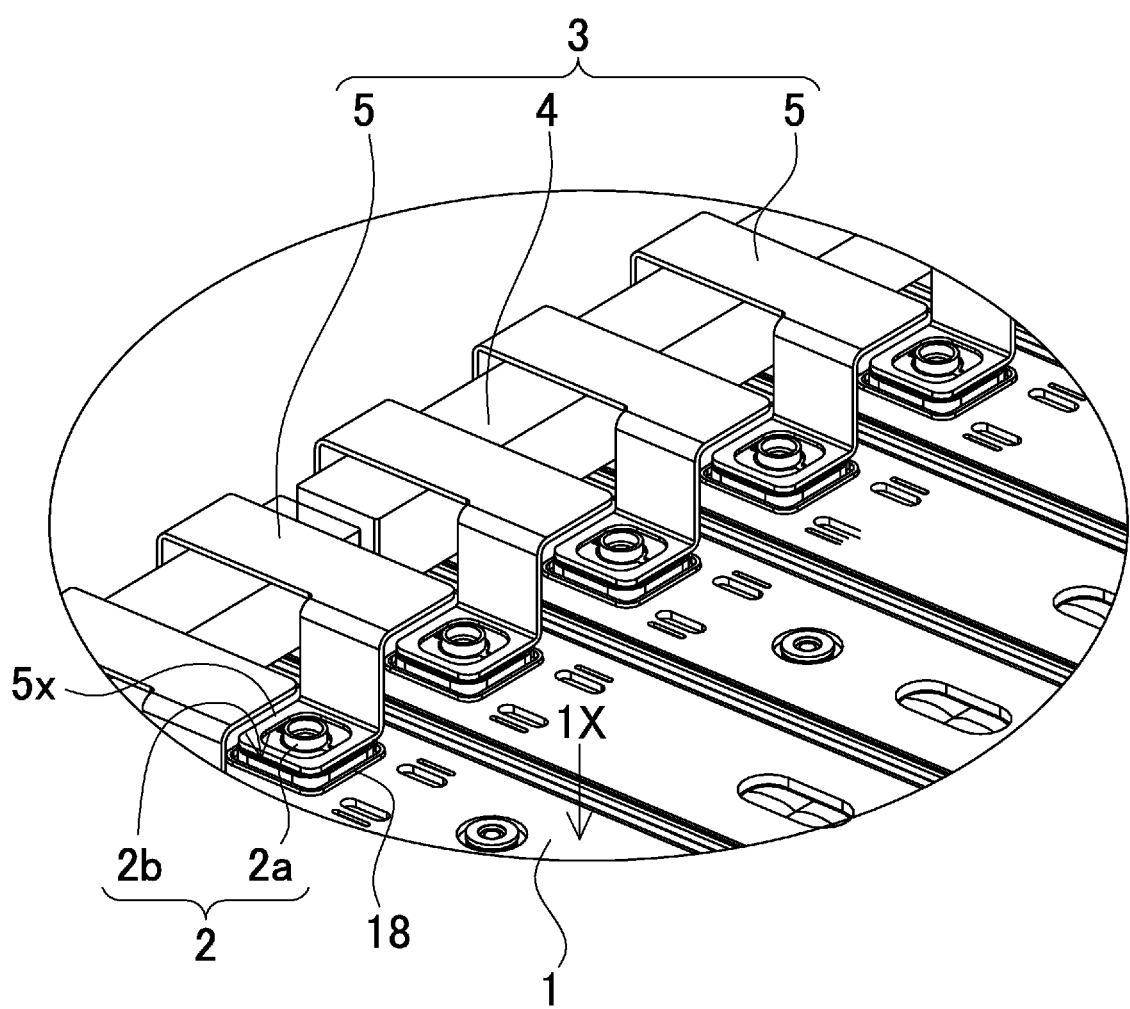
FIG. 3 is an enlarged perspective view of the power supply device illustrated in FIG. 1.
Figure 4:
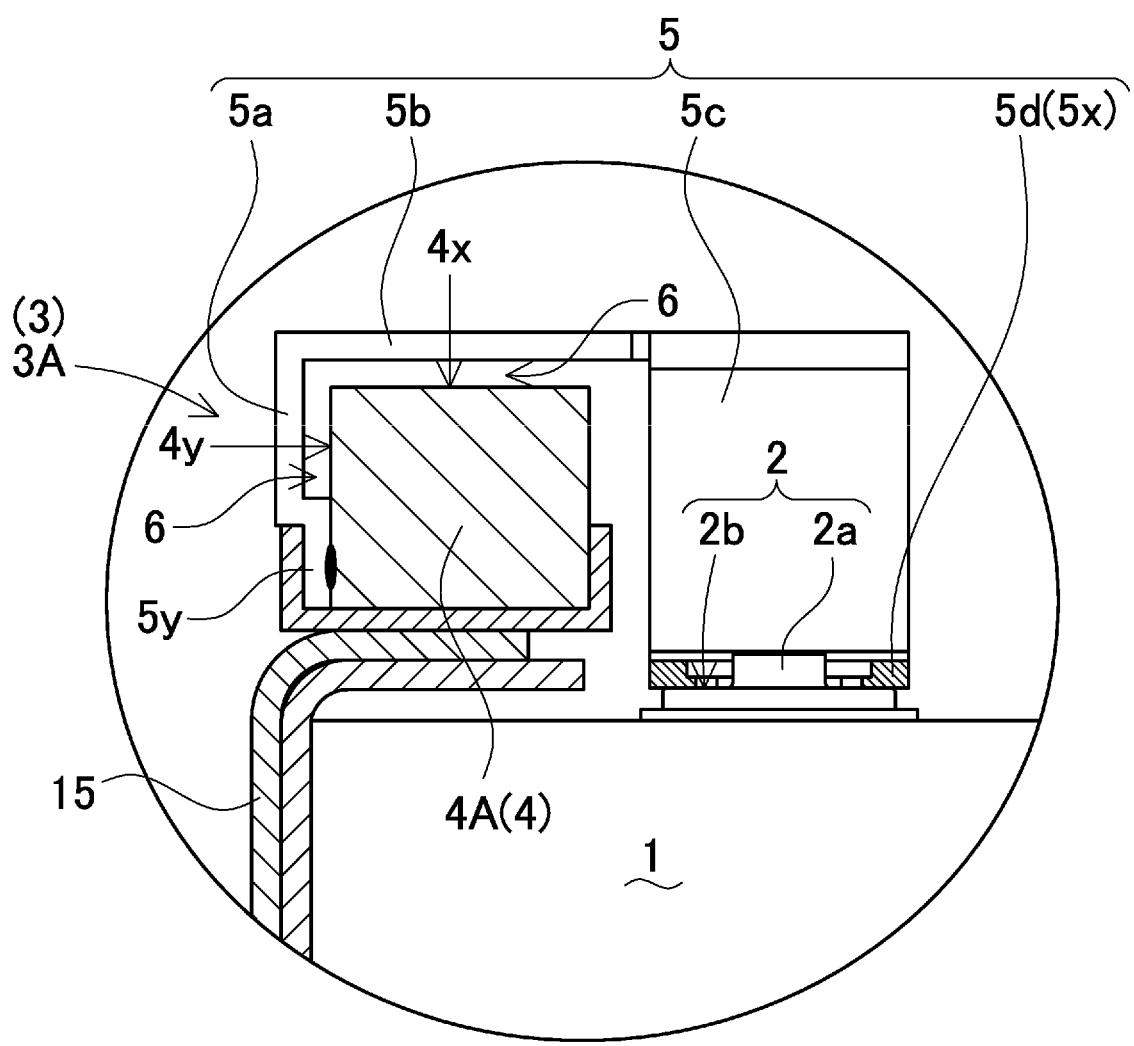
FIG. 4 is a vertical cross-sectional view illustrating a connection structure between a bus bar and an electrode terminal.

A power supply device according to a first exemplary embodiment of the present invention is illustrated in FIG. 1 to FIG. 4. In these drawings, FIG. 1 is a schematic perspective view of the power supply device, FIG. 2 is an exploded perspective view of the power supply device, and FIGS. 3 and 4 are an enlarged perspective view and a vertical cross-sectional view illustrating a connection structure between a bus bar and an electrode terminal, respectively. Power supply device 100 illustrated in FIG. 1 and FIG. 2 includes: a plurality of battery cells 1 each including positive and negative electrode terminals 2; and bus bars 3 connected to electrode terminals 2 of the plurality of battery cells 1 and connecting the plurality of battery cells 1 in parallel and in series. The plurality of battery cells 1 are connected in parallel and in series via bus bars 3. Battery cell 1 is a chargeable and dischargeable secondary battery. In power supply device 100, the plurality of battery cells 1 are connected in parallel to form a parallel battery group, and a plurality of parallel battery groups are connected in series. Accordingly, a large number of battery cells 1 are connected in parallel and in series. In power supply device 100 illustrated in FIG. 1 and FIG. 2, a plurality of battery cells 1 are stacked to form battery stack 10, and battery stack 10 is fixed by fixing component 13 so as to fix the plurality of battery cells 1 in a stacked state. Fixing component 13 includes a pair of end plates 14 disposed on both end surfaces of stacked battery cells 1, and fastening members 15 whose end portions are connected to end plates 14 to fix battery cells 1 in a stacked state in a pressurized state.

(Battery Cell 1)

Battery cell 1 is a quadrangular battery where a main surface, that is a wide surface, has a quadrangular profile, and a thickness of battery cell 1 is set smaller than a width of battery cell 1. Battery cell 1 is a secondary battery that can be charged and discharged, and is a lithium ion secondary battery. However, in the present invention, the battery cell is not particularly limited to a quadrangular battery, and is also not particularly limited to a lithium ion secondary battery. As the battery cell, all chargeable batteries, for example, non-aqueous electrolyte secondary batteries other than a lithium ion secondary battery, a nickel water battery cell, and the like can also be used.

In battery cell 1, an electrode assembly in which positive and negative electrode plates are stacked is housed in exterior can 1a, exterior can 1a is filled with an electrolytic solution, and exterior can 1a is airtightly sealed. Exterior can 1a is formed by molding into a hollow quadrangular columnar shape in a state where a bottom of exterior can 1a is closed, and an upper opening portion of exterior can 1a is airtightly closed by sealing plate 1b made of a metal plate. Exterior can 1a is manufactured by deep-drawing a metal plate made of aluminum, an aluminum alloy, or the like. Sealing plate 1b is manufactured using a metal plate that is made of aluminum, an aluminum alloy, or the like in the same manner as exterior can 1a. Sealing plate 1b is inserted into the opening portion of exterior can 1a, and a boundary between an outer periphery of sealing plate 1b and an inner periphery of exterior can 1a is irradiated with a laser beam. That is, sealing plate 1b is fixed to exterior can 1a in an airtight manner by laser welding.

(Electrode Terminal 2)

In battery cell 1, sealing plate 1b that is a top surface forms terminal surface 1X, and positive and negative electrode terminals 2 are fixed to both end portions of terminal surface 1X. As illustrated in FIG. 3 and FIG. 4, positive and negative electrode terminals 2 are each fixed to sealing plate 1b via insulating material 18, and are connected to built-in positive and negative electrode plates (not illustrated) respectively. Positive and negative electrode terminals 2 are each provided with welding surface 2b around protruding portion 2a. Welding surface 2b has a planar shape parallel to a surface of sealing plate 1b, and protruding portion 2a is formed on a center portion of welding surface 2b. In electrode terminal 2 illustrated in FIG. 3, protruding portion 2a has a circular columnar shape. However, the protruding portion is not necessarily formed into a circular columnar shape, and may be formed into a polygonal columnar shape or an elliptical columnar shape although not illustrated in the drawings. The present invention is also applicable to battery cell 1 where each electrode terminal has no protruding portion.

The positions at which positive and negative electrode terminals 2 are fixed to sealing plate 1b of battery cell 1 are set to positions where the positive electrode and the negative electrode are arranged in right and left symmetry. With such a configuration, battery cells 1 are stacked such that a left side and a right side of each battery cell 1 are reversed alternately, and electrode terminal 2 of a positive electrode and electrode terminal 2 of a negative electrode that are disposed adjacently and close to each other are connected by bus bar 3 so that battery cells 1 disposed adjacently to each other can be connected in series.

In the present specification, the vertical direction is a direction specified in the drawings. That is, as illustrated in the drawing, the height direction of the battery cell in a state where the bottom surface of the exterior can of the battery cell forms a lower surface of the battery cell and the terminal surface on which the electrode terminals are formed forms an upper surface of the battery cell is defined as the vertical direction.

(Battery Stack 10)

The plurality of battery cells 1 are stacked on each other to form battery stack 10. In the drawing, the battery stack is formed by stacking the plurality of battery cells 1 that are quadrangular batteries in the thickness of battery cell 1. In battery stack 10, the plurality of battery cells 1 are stacked such that terminal surfaces 1X on each of which the positive and negative electrode terminals 2 are mounted, that is, sealing plates 1b in the drawings are disposed coplanar with each other.

As illustrated in FIG. 2, in battery stack 10, insulating spacer 16 is sandwiched between respective battery cells 1 stacked on each other. In the drawings, insulating spacer 16 is manufactured in a thin plate shape or in a sheet shape using an insulating material such as a resin. Insulating spacer 16 illustrated in the drawing has a plate shape having substantially the same size as the surface of battery cell 1 that faces insulating spacer 16. By stacking insulating spacer 16 between battery cells 1 disposed adjacently to each other, battery cells 1 disposed adjacently to each other are insulated from each other. As the spacer disposed between battery cells 1 disposed adjacently to each other, it is possible to use a spacer having a shape that allows the formation of a flow path through which a cooling gas flows between battery cell 1 and the spacer. The surface of battery cell 1 can also be covered with an insulating material. For example, a shrink tube such as a polyethylene terephthalate (PET) resin may be applied by thermal welding to the surface of the exterior can except for the electrode portions of the battery cell. In this case, insulating spacer 16 may be omitted. In power supply device 100 according to the exemplary embodiment, since the plurality of battery cells are connected in a multiple parallel and multiple series manner. Accordingly, insulating spacer 16 is sandwiched between respective battery cells connected in series. However, with respect to the battery cells connected in parallel, a potential difference is not generated between the exterior cans disposed adjacently to each other and hence, the provision of the insulating spacer between these battery cells can be omitted.

Further, in power supply device 100 illustrated in FIG. 2, end plates 14 are disposed on both end surfaces of battery stack 10 in a state where end surface spacer 17 is sandwiched between battery stack 10 and each end plate 14. As illustrated in FIG. 2, end surface spacer 17 is disposed between battery stack 10 and end plate 14 so as to insulate end plate 14 from battery stack 10. End surface spacer 17 is manufactured in a thin plate shape or in a sheet shape using an insulating material such as a resin. End surface spacers 17 illustrated in the drawing are each stacked between battery cells 1 disposed at both ends of battery stack 10 and end plates 14. End surface spacer 17 has a size and a shape capable of covering the entire surface of quadrangular battery cell 1 that faces end surface spacer 17.

In battery stack 10, bus bar 3 made of metal is connected to positive and negative electrode terminals 2 of battery cells 1 disposed adjacently to each other, and the plurality of battery cells 1 are connected in parallel and in series via bus bars 3. In battery stack 10, with respect to the plurality of battery cells 1 that are connected in parallel to each other so as to form a parallel battery group, the plurality of battery cells 1 are stacked such that positive and negative electrode terminals 2 disposed at both end portions of terminal surface 1X are directed in the same direction at left and right sides. With respect to battery cells 1 that are connected in series to so as to form the parallel battery group, the plurality of battery cells 1 are stacked such that positive and negative electrode terminals 2 disposed at both end portions of terminal surface 1X are directed in reverse directions alternately at the left and right sides. In power supply device 100 illustrated in FIG. 1 and FIG. 2, battery stack 10 is formed by stacking twelve battery cells 1 in the thickness. In this case, two battery cells 1 are connected in parallel to form a parallel battery group, and six sets of parallel battery groups are connected in series so as to connect twelve battery cells 1 in a two-parallel and six-series mode. Therefore, in battery stack 10 illustrated in FIG. 2, each two battery cells 1 that form a parallel battery group are stacked such that positive electrode terminals 2 and negative electrode terminals 2 are directed in the same direction on the left and right sides, and six sets of parallel battery groups each formed of two battery cells 1 stacked in the same direction are stacked such that two positive electrode terminals and two negative electrode terminals 2 are alternately directed in opposite directions on the left and right sides. However, in the power supply device of the present invention, a number of battery cells that form the battery stack and the connection state of the battery cells are not particularly limited. In the power supply device, the number of battery cells that form the battery stack and the connection state of the battery cells can be also changed variously.

As described above, in the power supply device according to the present exemplary embodiment, in battery stack 10 in which the plurality of battery cells 1 are stacked on each other, electrode terminals 2 of the plurality of battery cells 1 disposed adjacently to each other are connected by bus bars 3 so that the plurality of battery cells 1 are connected in parallel and in series.

(Bus Bar 3)

Figure 5:
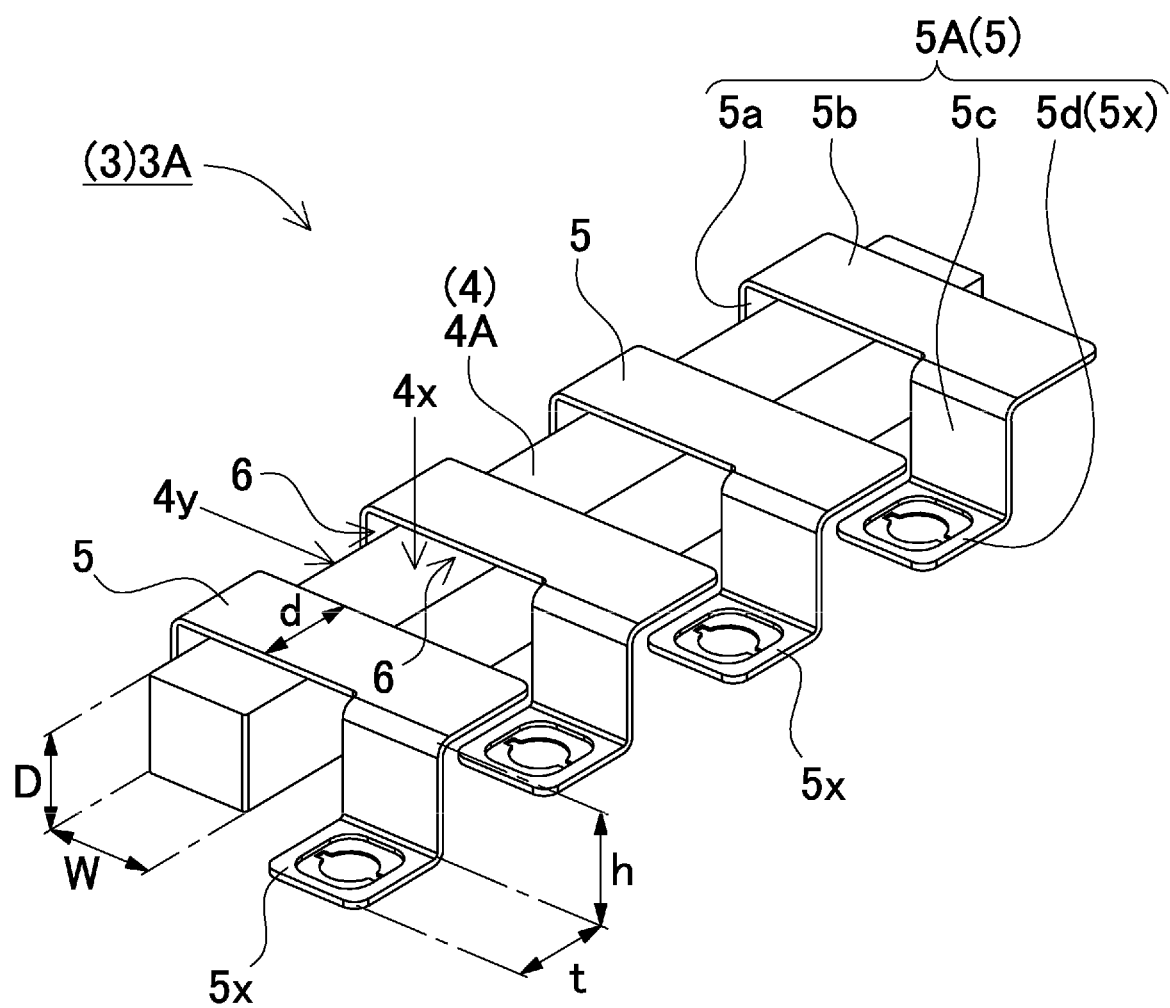
FIG. 5 is a perspective view of the bus bar illustrated in FIG. 3.
Figure 6:
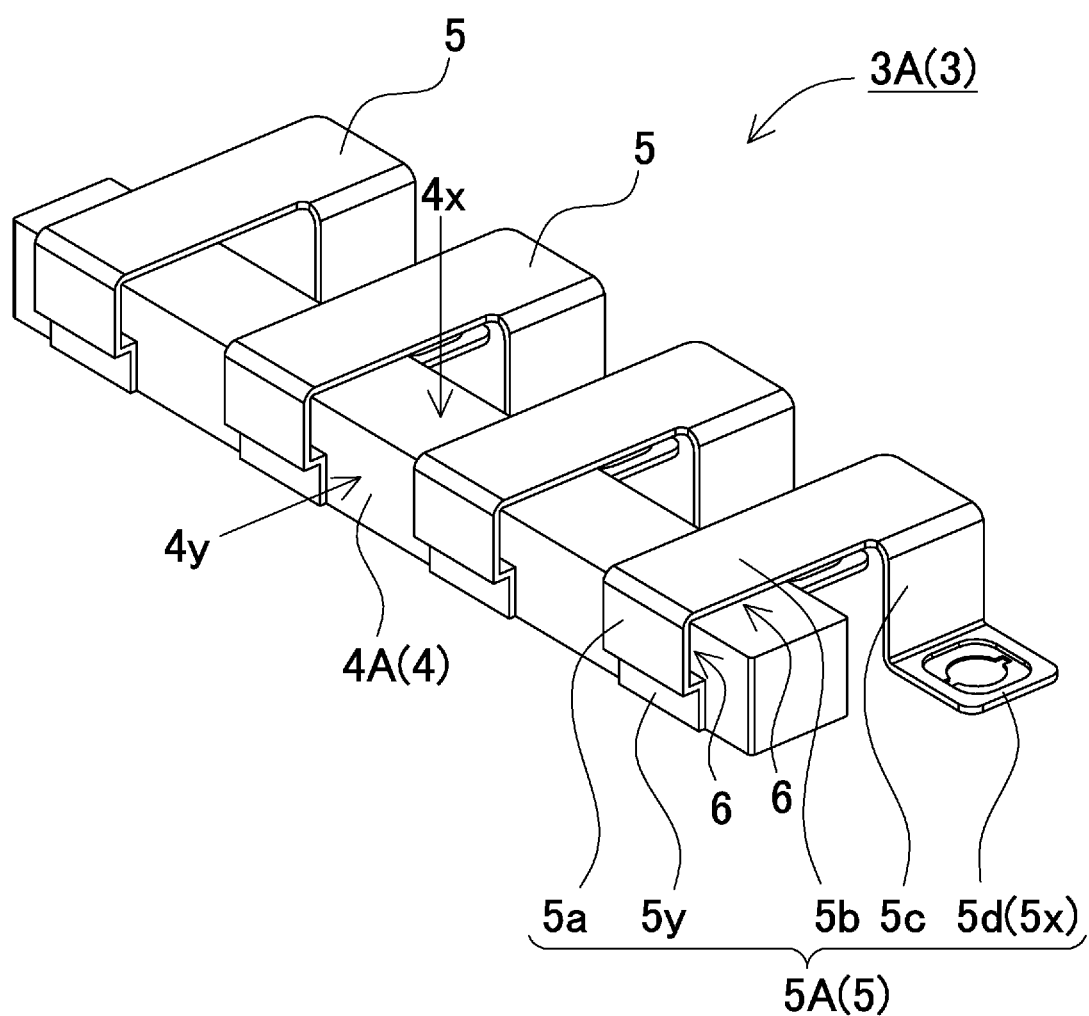
FIG. 6 is a rear perspective view of the bus bar illustrated in FIG. 5.

As illustrated in FIG. 5 and FIG. 6, in bus bar 3, arm portions 5 are connected to rod portion 4. Rod portion 4 and arm portions 5 are connected to each other by welding. Alternatively, as described in detail later, rod portion 4 and arm portions 5 are connected to each other as an integral structure by applying working to one metal plate. In forming rod portion 4 and arm portions 5, it is possible to use metal having small electric resistance and a light weight such as, for example, aluminum, an aluminum alloy, a copper plate, a copper alloy, or an alloy of aluminum and copper. However, a material used for forming the bus bar is not necessarily limited to metal. It is also possible to use all other materials that have small electric resistance and is elastically deformable. For example, a conductive plastic such as carbon-fiber reinforced plastic (CFRP).

In the power supply device of the present exemplary embodiment, bus bar 3 that connects electrode terminals 2 of the plurality of battery cells 1 has a unique structure. Hereinafter, the detailed structure of bus bar 3 will be described in detail with reference to the drawings. Bus bar 3 is connected to electrode terminals 2 of the plurality of battery cells 1 that are stacked on each other and are disposed adjacently to each other, and connects a large number of battery cells 1 in parallel and in series. With respect to bus bars 3 illustrated in FIG. 1 to FIG. 4, bus bars 3 are disposed on an upper surface of battery stack 10 in a state where bus bars 3 face terminal surfaces 1X of battery cells 1. On both sides of battery stack 10, bus bars 3 respectively connect electrode terminals 2 of the plurality of battery cells 1 arranged in the stacking direction of plurality of battery cells 1 to each other in a substantially straight line.

In bus bar 3 illustrated in FIG. 5 and FIG. 6, the plurality of arm portions 5 are connected to one rod portion 4. Bus bar 3 electrically connects battery cells 1 disposed adjacently to each other via arm portions 5 and rod portion 4. Distal end portion 5x of each arm portion 5 is welded to electrode terminal 2, and rear end portion 5y of each arm portion 5 is connected to rod portion 4. The plurality of arm portions 5 are connected to rod portion 4 at a right angle as viewed in a plan view. The plurality of arm portions 5 are arranged in parallel with each other. Distal end portions 5x of the plurality of arm portions 5 are welded to electrode terminals 2. In bus bar 3, arm portions 5 are connected to rod portion 4 such that arm portions 5 can be elastically deformed. Arm portion 5 that is elastically deformable can displace distal end portion 5x. Distal end portion 5x that is displaceable absorbs the positional deviation of electrode terminal 2 and arranges distal end portion 5x and electrode terminal 2 at the ideal position. Distal end portion 5x and electrode terminal 2 that are disposed at the ideal position are brought into close contact with each other without forming a gap between distal end portion 5x and electrode terminal 2, and distal end portion 5x and electrode terminal 2 are welded to each other with certainty. Rod portion 4 to which arm portions 5 are electrically connected has a cross-sectional area larger than a cross-sectional area of arm portion 5. Accordingly, rod portion 4 can electrically connect arm portions 5 with small electric resistance and hence, a power loss caused by the flow of a large current can be reduced.

In power supply device 100 illustrated in FIG. 1 and FIG. 2, a pair of rod portions 4 is disposed in parallel on battery stack 10, that is, is disposed in a state where the pair of rod portions 4 faces sealing plates 1b of battery cells 1. Rod portions 4 are disposed at fixed positions of battery stack 10 via arm portions 5. Alternatively, rod portions 4 are disposed at fixed positions of battery stack 10 via insulating holders (not illustrated). The pair of rod portions 4 is disposed outside positive and negative electrode terminals 2 in a state where the pair of rod portions 4 is insulated from battery cells 1. Rod portions 4 electrically connect battery cells 1 to each other that are stacked via arm portions 5. With such a configuration, each rod portion 4 is arranged in a posture extending in the arrangement direction of battery cells 1. Rod portion 4 is a rod member having a thickness larger than a thickness of arm portion 5 and is not elastically deformed. Since a current flows into rod portion 4 from the plurality of arm portions 5, as rod portion 4, it is preferable to use a metal rod having a straight line shape that has a cross-sectional area larger than a cross-sectional area of arm portion 5. Such rod portion 4 has electric resistance smaller than electric resistance of arm portion 5 and hence, such rod portion is not fused by generated heat.

Rod portion 4A of bus bar 3A illustrated in FIG. 4 to FIG. 6 is a quadrangular columnar metal rod having vertical surfaces 4y and horizontal surfaces 4x. In this drawing, rod portion 4A has a quadrangular columnar shape having horizontal surfaces 4x on the upper and lower sides and vertical surfaces 4y on both left and right sides. Rod portion 4A having a quadrangular columnar shape is formed such that rod portion 4A exhibits electric resistance sufficiently smaller than electric resistance of arm portion 5. For example, thickness (D) of rod portion 4A is set substantially equal to lateral width (W), preferably ½ or more of lateral width (W) such that the electric resistance of rod portion 4A becomes ½ or less, preferably ⅕ or less of the electric resistance of arm portion 5. The electric resistance of rod portion 4A can be reduced by increasing lateral width (W) and thickness (D) of rod portion 4A. In bus bar 3A illustrated in FIG. 5, lateral width (W) of rod portion 4A is set substantially equal to lateral width (d) of arm portion 5 so as to reduce the electric resistance of bus bar 3A.

Figure 7:
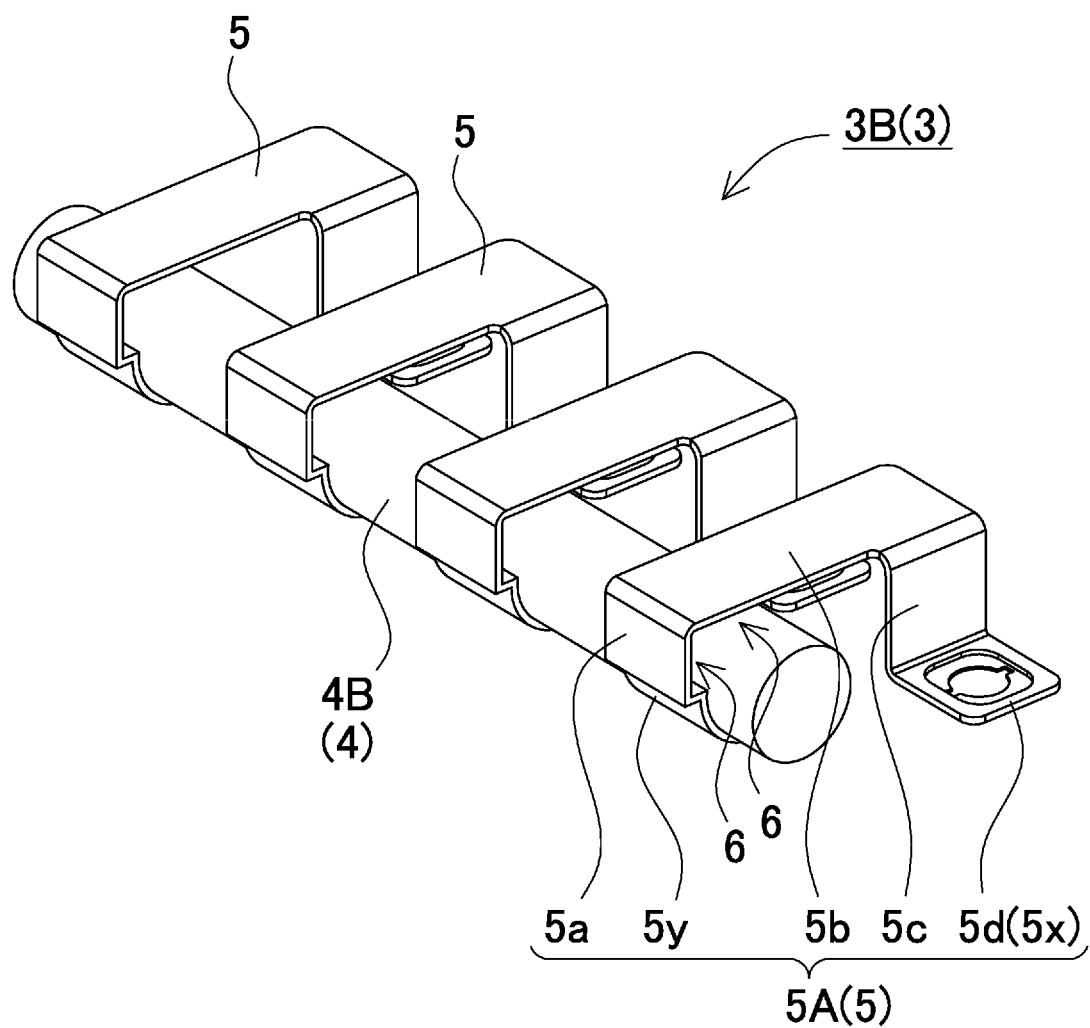
FIG. 7 is a perspective view illustrating another example of the bus bar.

Rod portion 4 does not necessarily have a quadrangular columnar shape. As illustrated in FIG. 7 that is a perspective view, rod portion 4B can have a circular columnar shape or an elliptical columnar shape. In bus bar 3B illustrated in FIG. 7, rear end portion 5y of arm portion 5 is welded and fixed to a surface of a curved outer peripheral surface of a metal rod having a circular columnar shape on a side surface of the metal rod.

Figure 8:
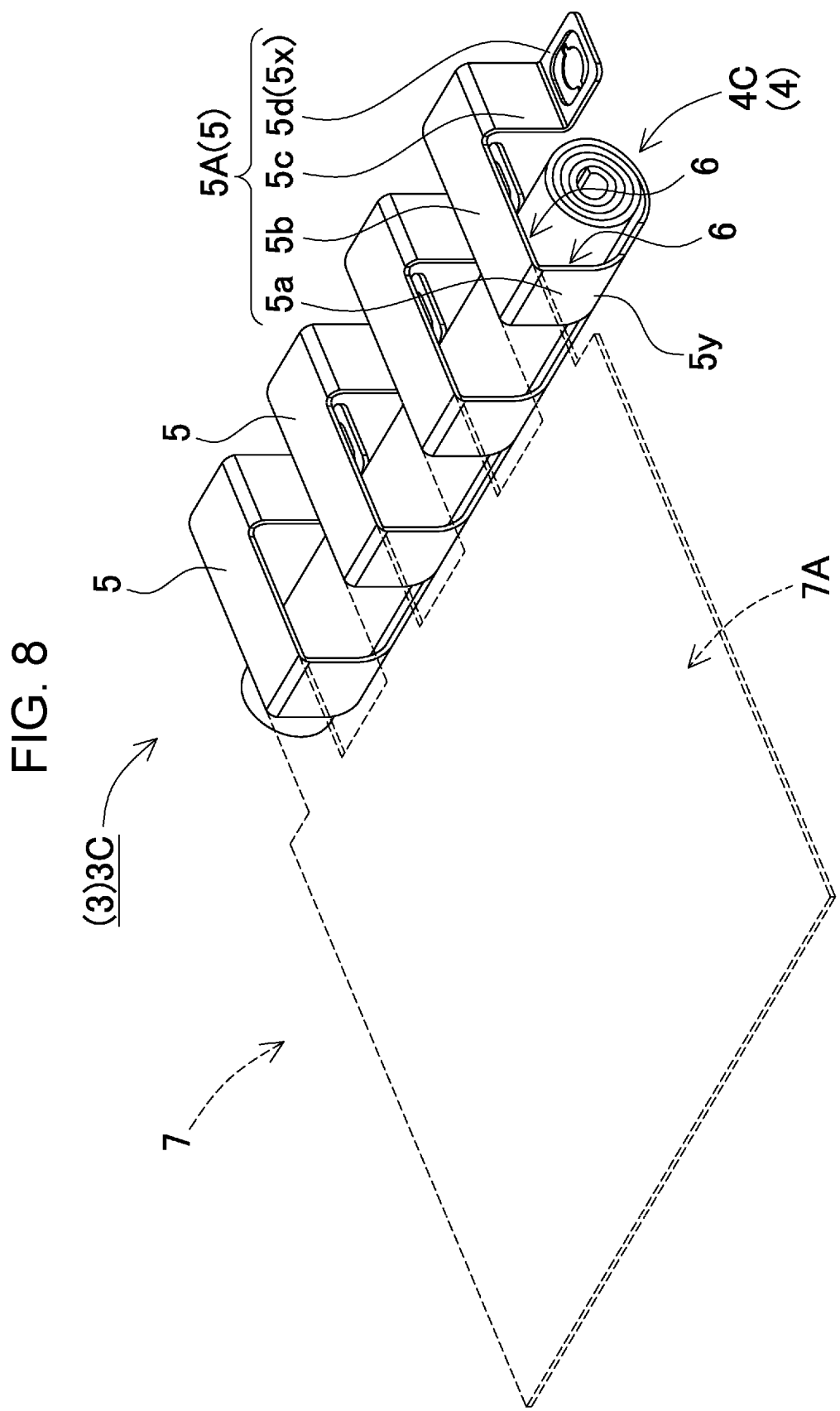
FIG. 8 is a perspective view illustrating another example of the bus bar.

As illustrated in FIG. 8, rod portion 4 can be formed into a straight line rod shape by winding and stacking metal plate 7 in a spiral shape. In rod portion 4C, a cross-sectional area of rod portion 4C is increased by stacking metal plate 7 in a spiral shape so that electric resistance of rod portion 4C can be reduced. In rod portion 4C where a surface of rod portion 4C is formed of metal plate 7, rod portion 4C and arm portion 5 can be formed into an integral structure. Bus bar 3C where rod portion 4C is formed by winding metal plate 7 in a spiral shape can be manufactured in such a manner that metal plate 7 is cut in a desired shape and, then, is wound in a spiral shape so that rod portion 4C and arm portions 5 are formed into an integral structure. Bus bar 3C can be manufactured in such a manner that, as indicated by a chain line in the drawing, metal plate 7 to be wound is cut into a shape where a plurality of arm portions 5 protrude in parallel from one side edge of quadrangular region 7A that forms rod portion 4C by winding and, then, quadrangular region 7A is wound in a spiral shape. Bus bar 3C where both arm portions 5 and rod portion 4C are formed of single metal plate 7 is characterized in that arm portions 5 and rod portion 4C are connected in an ideal state so that a connecting portion acquire a high strength, and electrical resistance of the connecting portion can be reduced.

Figure 13:
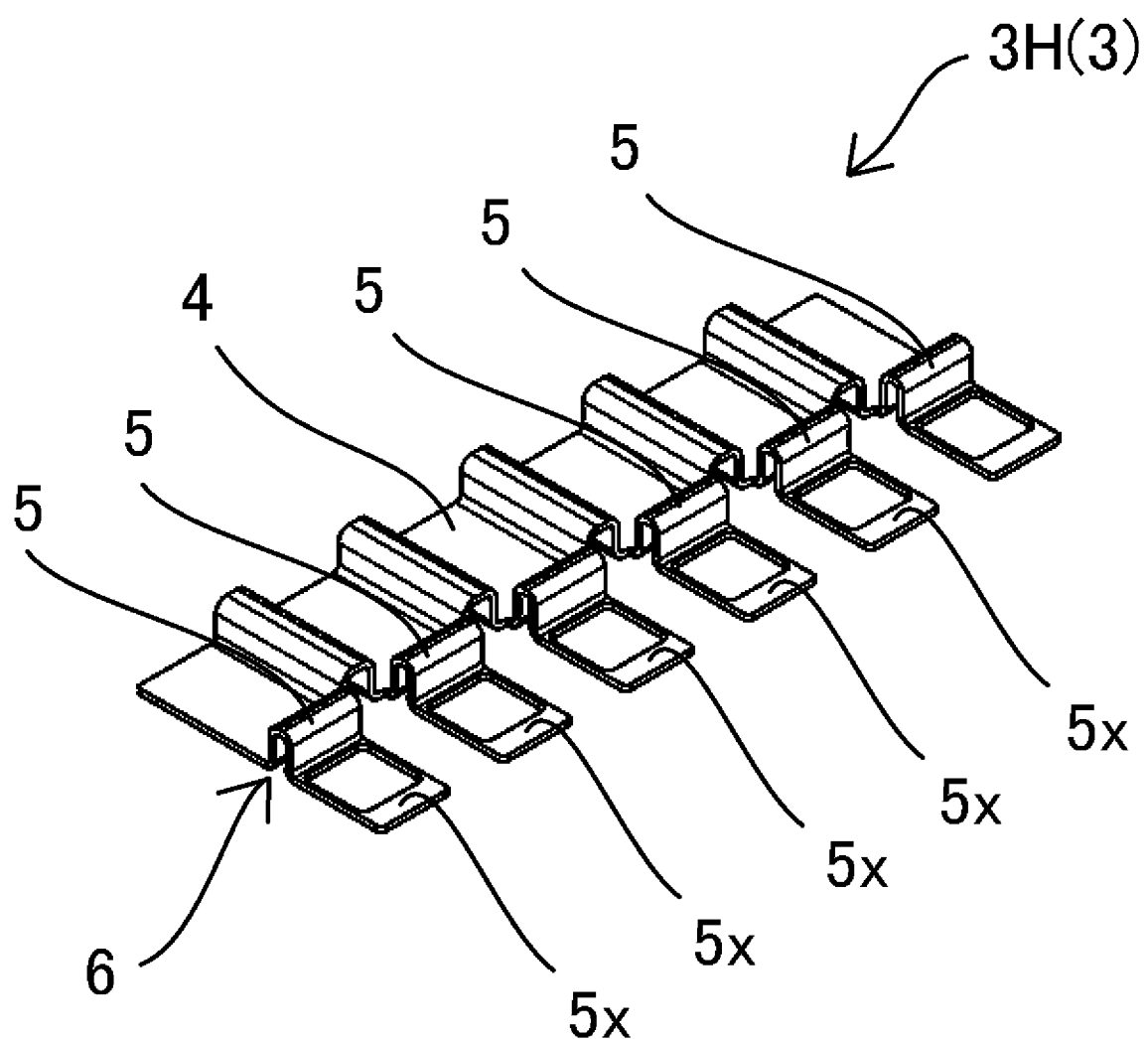
FIG. 13 is a perspective view illustrating another example of the bus bar.

Bus bar 3H illustrated in FIG. 13 is configured such that one rod portion 4 and a plurality of arm portions 5 are integrally formed with each other by molding. Specifically, rod portion 4 and arm portions 5 are formed of a single metal plate, and a cross-sectional area of rod portion 4 is increased by increasing a width or a thickness of rod portion 4 compared to arm portions 5. The arm portions may be made thinner than the rod portion by rolling or the like to impart flexibility to the arm portions. In this case, the bus bar and the electrode terminals are brought into close contact with each other in a stacked state without forming a gap so that welding can be performed with certainty. In addition, bus bar 3H is configured such that curved portions are formed on both rod portion 4 and arm portions 5 by applying bending to both rod portion 4 and arm portions 5. With such a configuration, bus bar 3H is allowed to perform both the displacement in the horizontal direction and the displacement in the vertical direction.

Furthermore, as illustrated in FIG. 9 to FIG. 12, rod portion 4 of bus bar 3 may include: cylindrical portions 4a, 4b, 4c having a straight line shape and formed in a hollow columnar shape by bending metal plate 7; and columnar portion 4d, 4e made of metal inserted into cylindrical portions 4a, 4b, 4c respectively. In bus bars 3D, 3E, 3F, 3G illustrated in the drawings, columnar portions 4d and 4e are press-fitted into cylindrical portions 4a, 4b, 4c that are formed by forming metal plate 7 in a hollow columnar shape, so that cylindrical portions 4a, 4b, 4c and columnar portions 4d, 4e have an integral structure. In rod portions 4D, 4E, 4F, cylindrical portions 4a, 4b, 4c and columnar portions 4d, 4e may be made of the same metal or different metals. In rod portions 4D, 4E, 4F, cylindrical portion 4a, 4b, 4c formed of metal plate 7 and columnar portions 4d, 4e made of metal are integrally connected to each other and hence, a cross-sectional area of rod portion 4D, 4E, 4F is increased, whereby electric resistance of rod portions 4D, 4E, 4F is reduced.

Figure 9:
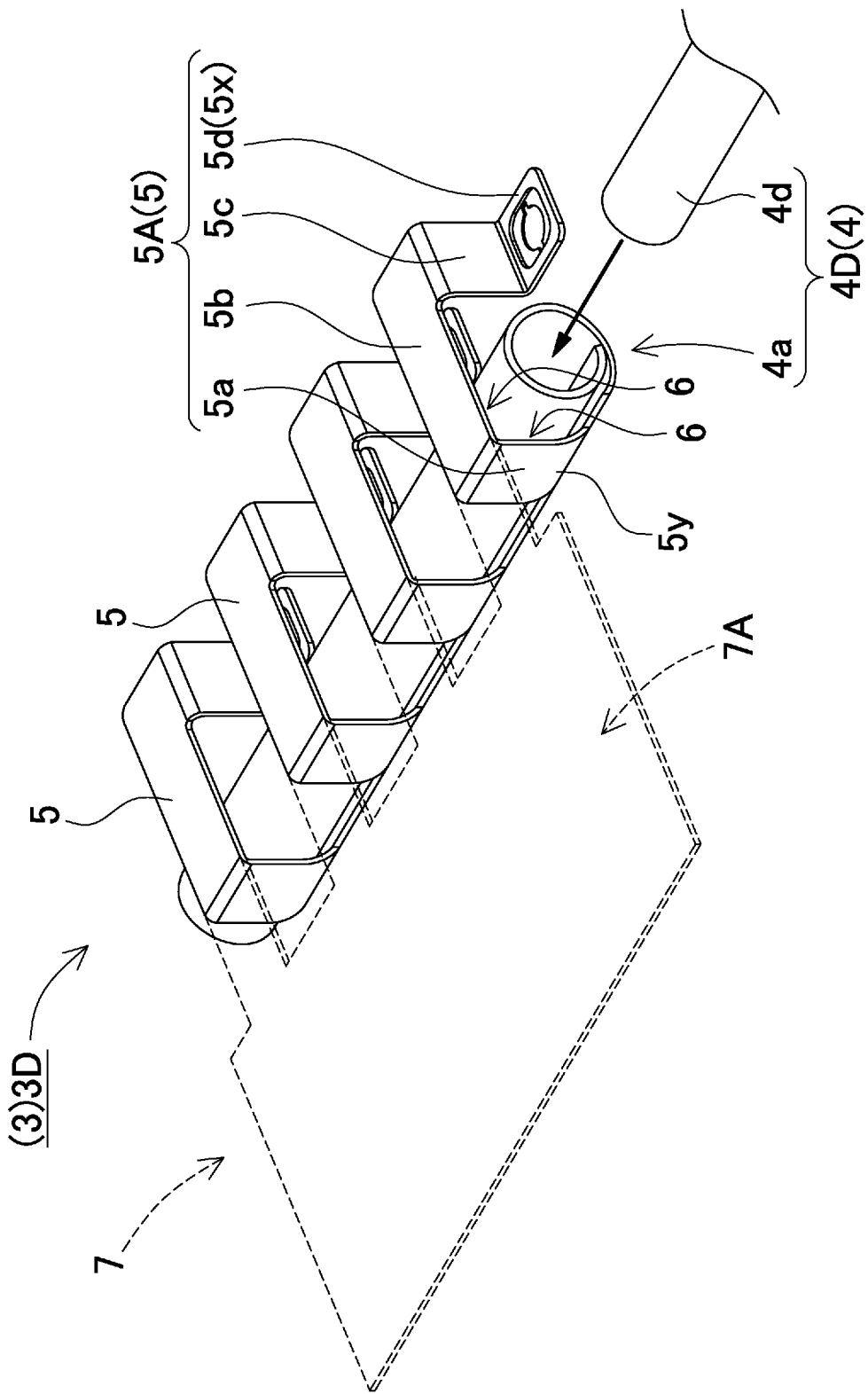
FIG. 9 is a perspective view illustrating another example of the bus bar.
Figure 10:
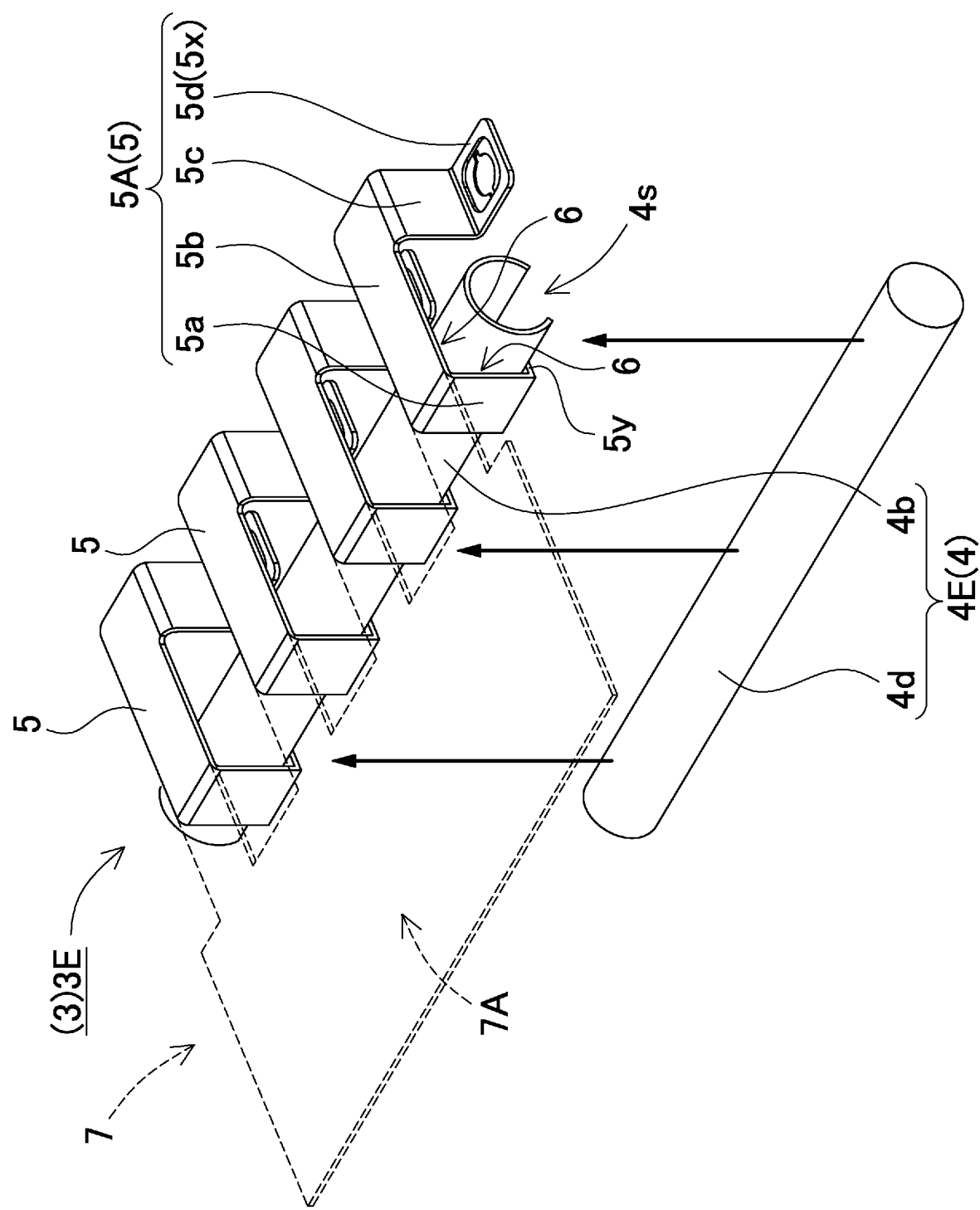
FIG. 10 is a perspective view illustrating another example of the bus bar.

Bus bars 3D, 3E illustrated in FIG. 9 and FIG. 10 each have an integral structure where columnar portion 4d having a circular columnar shape is inserted into cylindrical portion 4a, 4b formed by bending metal plate 7 into a circular hollow columnar shape. In bus bars 3D, 3E where metal plate 7 is formed into a circular hollow columnar shape by bending so as to form cylindrical portion 4a, 4b, rod portion 4D, 4E and arm portions 5 can be manufactured as an integral structure by bending metal plate 7. As indicated by chain lines in FIG. 9 and FIG. 10, bus bars 3D, 3E are manufactured such that metal plate 7 is cut into a shape where a plurality of arm portions 5 protrude in parallel from one side edge of quadrangular region 7A that is scheduled to form cylindrical portion 4a, 4b by bending, quadrangular region 7A is formed into a circular hollow columnar shape by bending thus forming cylindrical portion 4a, 4b, and columnar portion 4d is press-fitted into circular cylindrical portion 4a, 4b.

Rod portion 4E illustrated in FIG. 10 adopts the structure where slit 4s is formed in a portion of cylindrical portion 4b having a circular hollow columnar shape so as to form rod portion 4E into a hollow columnar shape that allows rod portion 4E to be easily elastically deformed so that columnar portion 4d can be smoothly press-fitted into cylindrical portion 4b. Slit 4s is formed by forming a gap between side edges of metal plate 7 that face each other at the time of bending quadrangular region 7A of metal plate 7 into a circular hollow columnar shape. By folding arm portions 5 connected to one side edge of the quadrangular region 7A by 180 degrees with respect to quadrangular region 7A, columnar portion 4d can be guided into slit 4s without closing an opening portion of slit 4s by arm portion 5.

Figure 11:
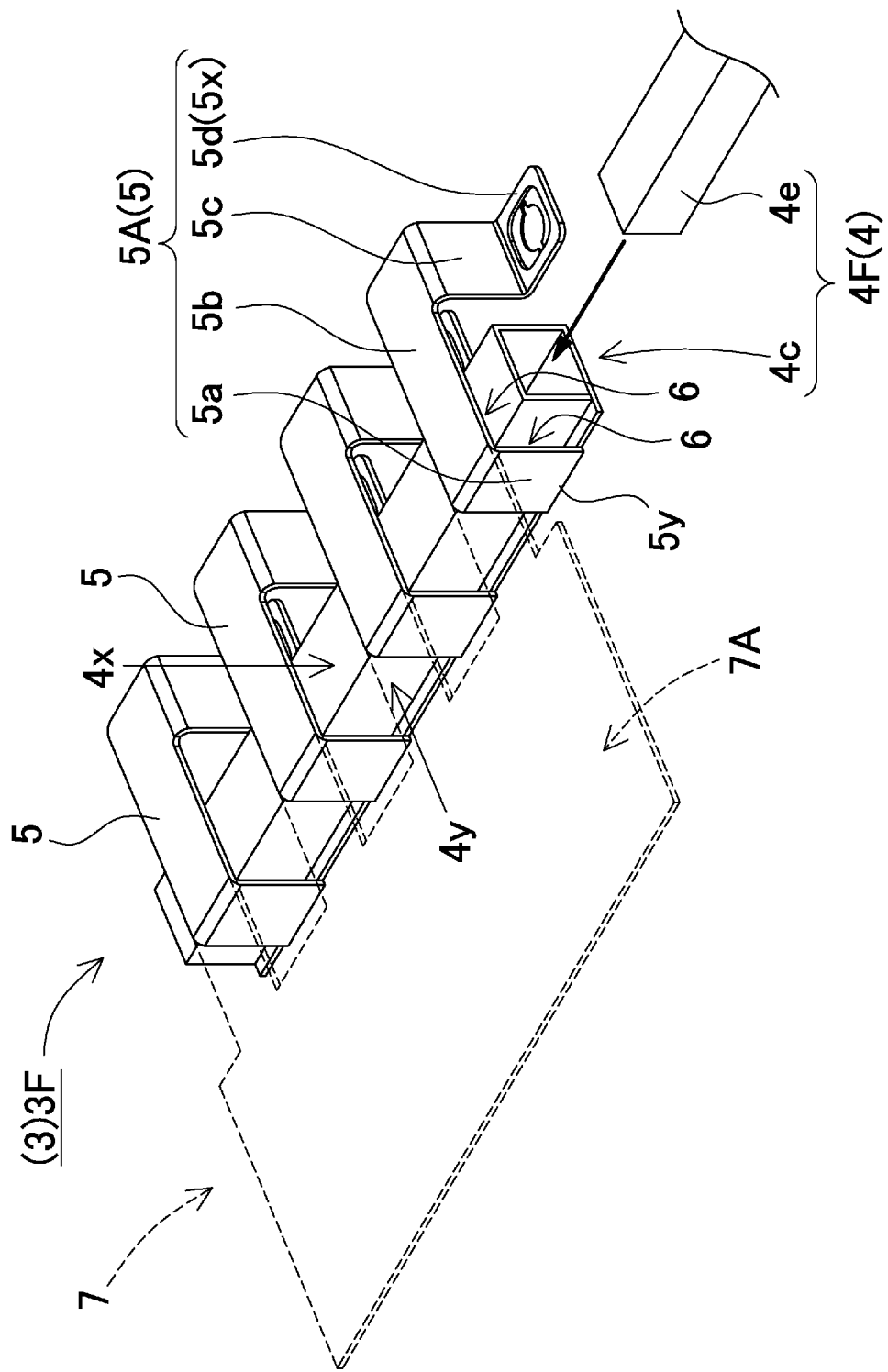
FIG. 11 is a perspective view illustrating another example of the bus bar.
Figure 12:
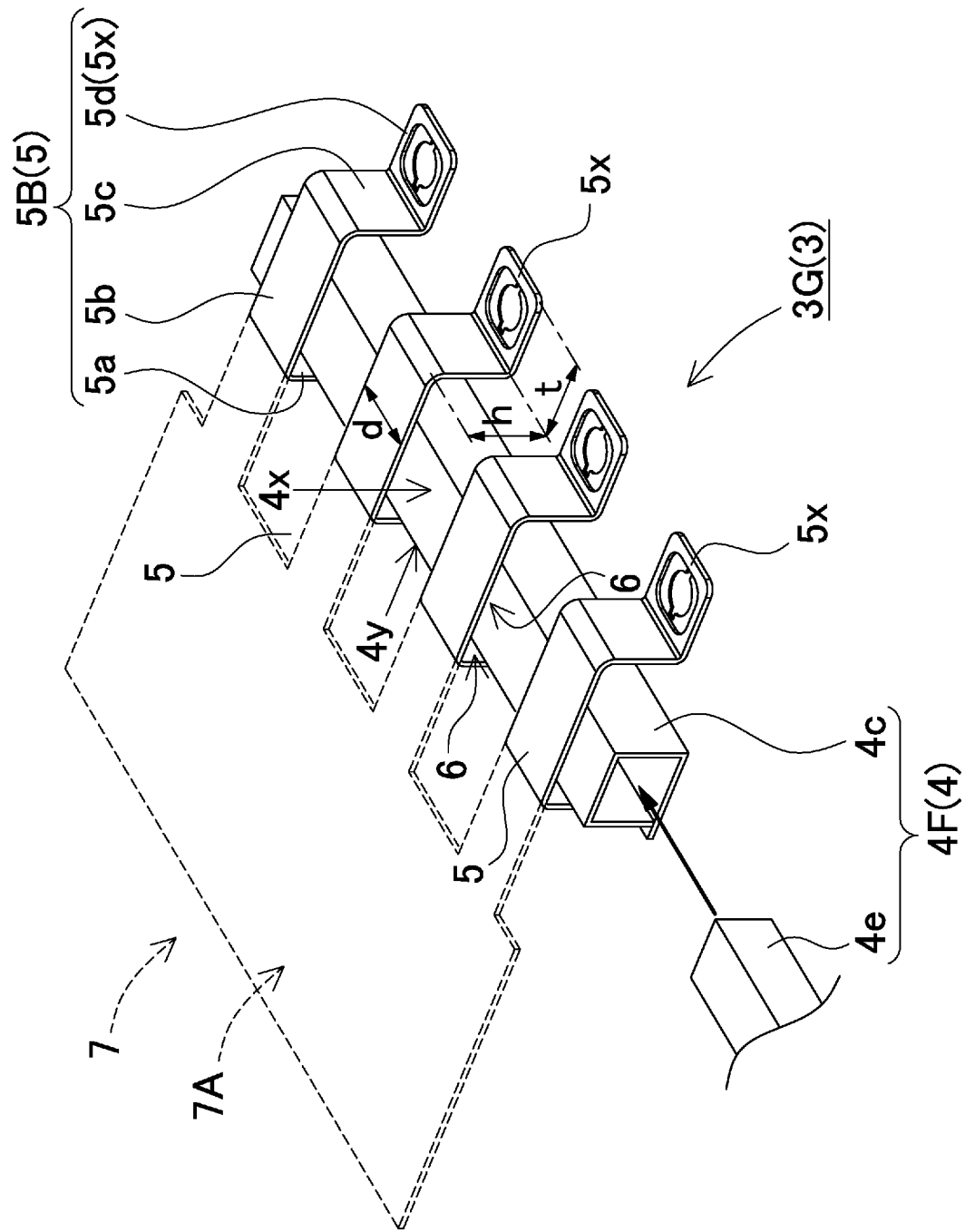
FIG. 12 is a perspective view illustrating another example of the bus bar.

Bus bars 3F, 3G illustrated in FIG. 11 and FIG. 12 have an integral structure where columnar portion 4e having a quadrangular columnar shape is inserted into cylindrical portion 4c formed by bending metal plate 7 into a hollow quadrangular columnar shape. In bus bars 3F, 3G where metal plate 7 is formed into a quadrangular columnar shape by bending so as to form cylindrical portion 4c, rod portion 4F and arm portions 5 can be manufactured as an integral structure by bending metal plate 7. As indicated by chain lines in FIG. 11 and FIG. 12, bus bar 3F is manufactured such that metal plate 7 is cut into a shape where the plurality of arm portions 5 protrude in parallel from one side edge of quadrangular region 7A that is scheduled to form cylindrical portion 4c by bending, quadrangular region 7A is formed into a quadrangular hollow columnar shape by bending thus forming cylindrical portion 4c, and columnar portion 4e is press-fitted into cylindrical portion 4c.

As described above, in bus bar 3D, 3E, 3F, 3G where cylindrical portion 4a, 4b, 4c of rod portion 4D, 4E, 4F and arm portions 5 are formed of single metal plate 7, rod portion 4D, 4E, 4F and arm portions 5 are connected in an ideal state so that a connecting portion acquire a high strength, and electrical resistance of the connecting portion can be reduced.

Arm portion 5 is an elastically deformable conductive plate such as an elastic metal plate, and has a structure in which distal end portion 5x can be displaced by being elastically deformed. In arm portion 5 where distal end portion 5x can be displaced, the position of distal end portion 5x can be moved to the position optimum for welding electrode terminal 2 whose relative position is deviated due to a dimensional error or the like. Deformation gap 6 is formed between arm portion 5 and rod portion 4 in order to increase an amount of displacement of distal end portion 5x generated by elastic deformation. Deformation gap 6 between arm portion 5 and rod portion 4 increases a length of a region where arm portion 5 is elastically deformed thus increasing displacement generated by the elastic deformation.

With respect to arm portions 5 illustrated in FIG. 4 to FIG. 6, FIG. 11, and FIG. 12, a rear end of each arm portion 5 is connected to rod portion 4 in a state where deformation gap 6 is formed between arm portion 5 and horizontal surface 4x of quadrangular columnar rod portion 4 having vertical surfaces 4y and horizontal surfaces 4x. Deformation gap 6 is formed between arm portion 5 and horizontal surface 4x of rod portion 4 on an upper side so as to increase an amount of displacement by which distal end portion 5x is vertically movable in the drawing. In other words, by forming deformation gap 6 between horizontal surface 4x that forms the upper surface of rod portion 4 and arm portion 5, the displacement of distal end portion 5x of arm portion 5 in the vertical direction is allowed. In arm portion 5 in which distal end portion 5x can be vertically positionally deviated, distal end portion 5x is disposed at an optimum position of electrode terminal 2 of battery cell 1 that is vertically displaced and hence, arm portion 5 can be welded in a state where the relative position between distal end portion 5x and electrode terminal 2 is disposed at the ideal position. Distal end portion 5x is welded to electrode terminal 2 by a method such as spot welding or laser welding. In both welding methods, distal end portion 5x and electrode terminal 2 can be welded to each other in a close contact without forming a gap between distal end portion 5x and electrode terminal 2 with certainty. In arm portion 5 where distal end portion 5x can be deviated vertically, distal end portion 5x can be moved to and disposed at the position of electrode terminal 2 even when the relative position of electrode terminal 2 is vertically displaced due to a dimensional error. With the provision of distal end portion 5x that is brought into close contact with electrode terminal 2 without forming a gap between distal end portion 5x and electrode terminal 2, in performing spot welding, power can be supplied to both distal end portion 5x and electrode terminal 2 in an ideal state. Accordingly, both distal end portion 5x and electrode terminal 2 can be thermally welded to each other on a contact surface with certainty. Also in laser welding, with respect to distal end portion 5x that is brought into close contact with electrode terminal 2 without forming a gap, the contact portion of distal end portion 5x is melted by a laser beam and is thermally welded to electrode terminal 2 with certainty. In spot welding and laser welding, thermal welding between distal end portion 5x and electrode terminal 2 is performed in a state where distal end portion 5x is pressed against electrode terminal 2 so that distal end portion 5x and electrode terminal 2 are brought into close contact with each other. Therefore, arm portion 5 that is elastically deformed and can move distal end portion 5x toward electrode terminal 2 can bring distal end portion 5x into close contact with electrode terminal 2 without forming a gap and hence, distal end portion 5x and electrode terminal 2 can be thermally welded to each other with certainty. Since the deformation gap exists even after welding and hence, arm portion 5 exhibits strong resistance against an impact and vibrations.

Furthermore, in arm portions 5 illustrated in FIG. 4 to FIG. 6, FIG. 11, and FIG. 12, deformation gap 6 is also formed between arm portion 5 and vertical surface 4y of rod portion 4, and a rear end (a lower end in the drawing) of arm portion 5 is connected to rod portion 4. In arm portions 5 illustrated in these drawings, arm portion 5 is bent into a shape along a region ranging from horizontal surface 4x to vertical surface 4y of rod portion 4, and deformation gap 6 is formed between horizontal surface 4x and vertical surface 4y of rod portion 4. In this manner, by forming deformation gap 6 between vertical surface 4y that forms the side surface of rod portion 4 and arm portion 5, the displacement of distal end portion 5x of arm portion 5 in the horizontal direction is allowed. Distal end portion 5x of arm portion 5 can be displaced also corresponding to the positional deviation of electrode terminal 2 in the horizontal plane. Accordingly, even when electrode terminal 2 is displaced in the horizontal plane due to an error in a manufacturing process, distal end portion 5x is allowed to move to an accurate position of electrode terminal 2 and is welded to electrode terminal 2 with certainty and hence, arm portion 5 exhibits strong resistance against an impact and vibrations.

Further, as illustrated in FIG. 7 to FIG. 10, also in bus bar 3 that includes rod portion 4 having a circular columnar profile, deformation gap 6 is formed between arm portion 5 and an upper surface or a side surface of circular columnar rod portion 4 that forms an outer peripheral surface of circular columnar rod portion 4, and a rear end of arm portion 5 is connected to rod portion 4. Also in these bus bars 3, displacement of distal end portion 5x of arm portion 5 in the vertical direction is allowed by forming deformation gap 6 between the upper surface of rod portion 4 and arm portion 5. Furthermore, displacement of distal end portion 5x of arm portion 5 in the horizontal direction is allowed by forming deformation gap 6 between the side surface of rod portion 4 and arm portion 5.

Furthermore, arm portion 5A illustrated in FIG. 4 to FIG. 11 includes: connecting arm portion 5a arranged on a side surface of rod portion 4 and having rear end portion 5y that is connected to rod portion 4; horizontal arm portion 5b connected to an upper end of connecting arm portion 5a and extending toward a distal end over the upper surface of rod portion 4; vertical arm portion 5c having a plate shape and connected to a side edge of horizontal arm portion 5b; and welding portion 5d connected to vertical arm portion 5c in a horizontal posture. Arm portion 5A allows welding portion 5d that forms distal end portion 5x to be displaced in the stacking direction of battery cells 1 and in the horizontal direction that is orthogonal to the stacking direction of battery cells 1 in the horizontal plane. Therefore, the first exemplary embodiment is characterized in that the positional deviation of electrode terminal 2 of battery cell 1 in the X-axis direction (the stacking direction of battery cells 1 in the drawing) and in the Y-axis direction (the direction orthogonal to the stacking direction in the drawing) can be corrected and, then, distal end portion 5x can be welded to electrode terminal 2.

Furthermore, arm portion 5B illustrated in FIG. 12 includes: connecting arm portion 5a arranged on the side surface of rod portion 4 and having rear end portion 5y connected to rod portion 4; horizontal arm portion 5b connected to the upper end of connecting arm portion 5a and extending toward the distal end over the upper surface of rod portion 4; plate-shaped vertical arm portion 5c connected to the distal end edge of horizontal arm portion 5b; and welding portion 5d connected to vertical arm portion 5c in a horizontal posture. In arm portion 5B, welding portion 5d can be disposed on an extension line of horizontal arm portion 5b in a plan view. Accordingly, width (d) of horizontal arm portion 5b and total length (t) of welding portion 5d can be increased without being affected by the distance between the electrode terminals of battery cells 1 stacked on each other. In particular, arm portion 5B having such a structure can be suitably used as arm portion 5 formed of metal plate 7 and integrally connected to rod portion 4. In this case, in addition to width (d) of horizontal arm portion 5b and total length (t) of welding portion 5d, total length (h) of vertical arm portion 5c can be set large.

The power supply device described above is optimal for a power supply for a vehicle that supplies power to a motor that allows an electric vehicle to travel. As an electric vehicle on which a power supply device is mounted, an electric vehicle such as a hybrid car or a plug-in hybrid car that travels by both an engine and a motor, or an electric car that travels only by a motor can be used. The power supply device is used as a power supply for these electric vehicles.

(Power Supply Device for Hybrid Vehicle)

Figure 14:
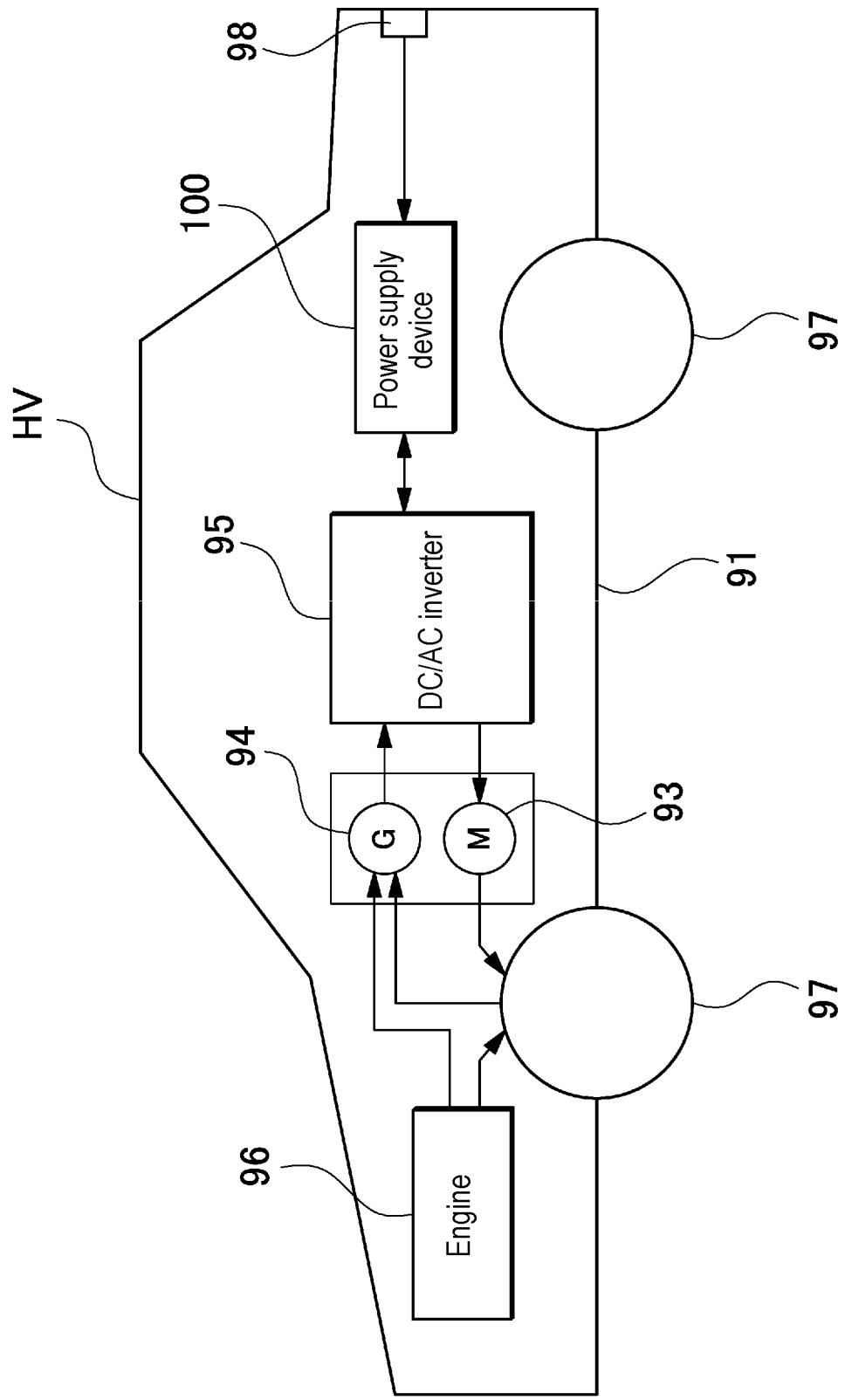
FIG. 14 is a block diagram illustrating an example in which a power supply device is mounted on a hybrid vehicle that travels by an engine and a motor.

FIG. 14 illustrates an example where a power supply device is mounted on a hybrid vehicle that travels by both an engine and a motor. Vehicle HV illustrated in the drawing on which the power supply device is mounted includes: vehicle body 91; engine 96 and motor 93 for traveling that allow vehicle body 91 to travel; wheels 97 driven by engine 96 and motor 93 for traveling; power supply device 100 that supplies power to motor 93; and generator 94 that charges a battery of power supply device 100. Power supply device 100 is connected to motor 93 and generator 94 via DC/AC inverter 95. Vehicle HV travels by both motor 93 and engine 96 while charging and discharging the battery of power supply device 100. Motor 93 is driven to allow the vehicle to travel in an area where engine efficiency becomes low, for example, at the time of acceleration or at the time of low speed traveling. Motor 93 is driven by power supplied from power supply device 100. Generator 94 is driven by engine 96 or by regenerative braking generated at the time of applying braking to the vehicle, and charges the battery of power supply device 100. As illustrated in FIG. 14, vehicle HV may include charging plug 98 for charging power supply device 100. Power supply device 100 can be charged by connecting charging plug 98 to an external power supply.

(Power Supply Device for Electric Car)

Figure 15:
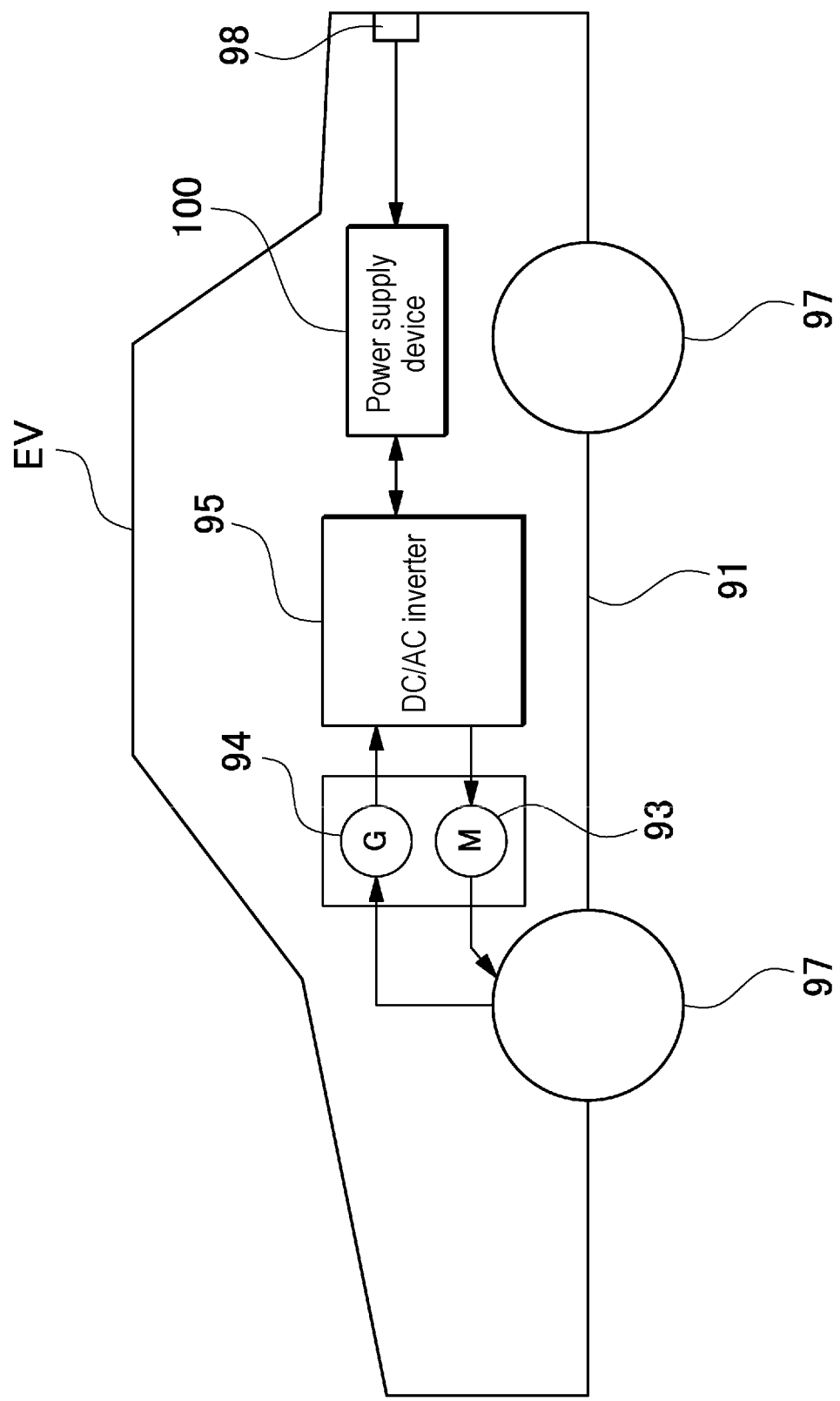
FIG. 15 is a block diagram illustrating an example in which a power supply device is mounted on an electric vehicle that travels only by a motor.

FIG. 15 shows an example where a power supply device is mounted on an electric car that travels only by a motor. Vehicle EV illustrated in this drawing on which the power supply device is mounted includes: vehicle body 91, motor 93 for traveling that allows vehicle body 91 to travel; wheels 97 driven by motor 93; power supply device 100 that supplies power to motor 93; and generator 94 that charges a battery of power supply device 100. Power supply device 100 is connected to motor 93 and generator 94 via DC/AC inverter 95. Motor 93 is driven by power supplied from power supply device 100. Generator 94 is driven by energy at the time of regenerative braking of vehicle EV, and charges a battery of power supply device 100. In addition, vehicle EV includes charging plug 98, and power supply device 100 can be charged by connecting charging plug 98 to an external power supply.

(Power Supply Device for Power Storage Device)

Figure 16:
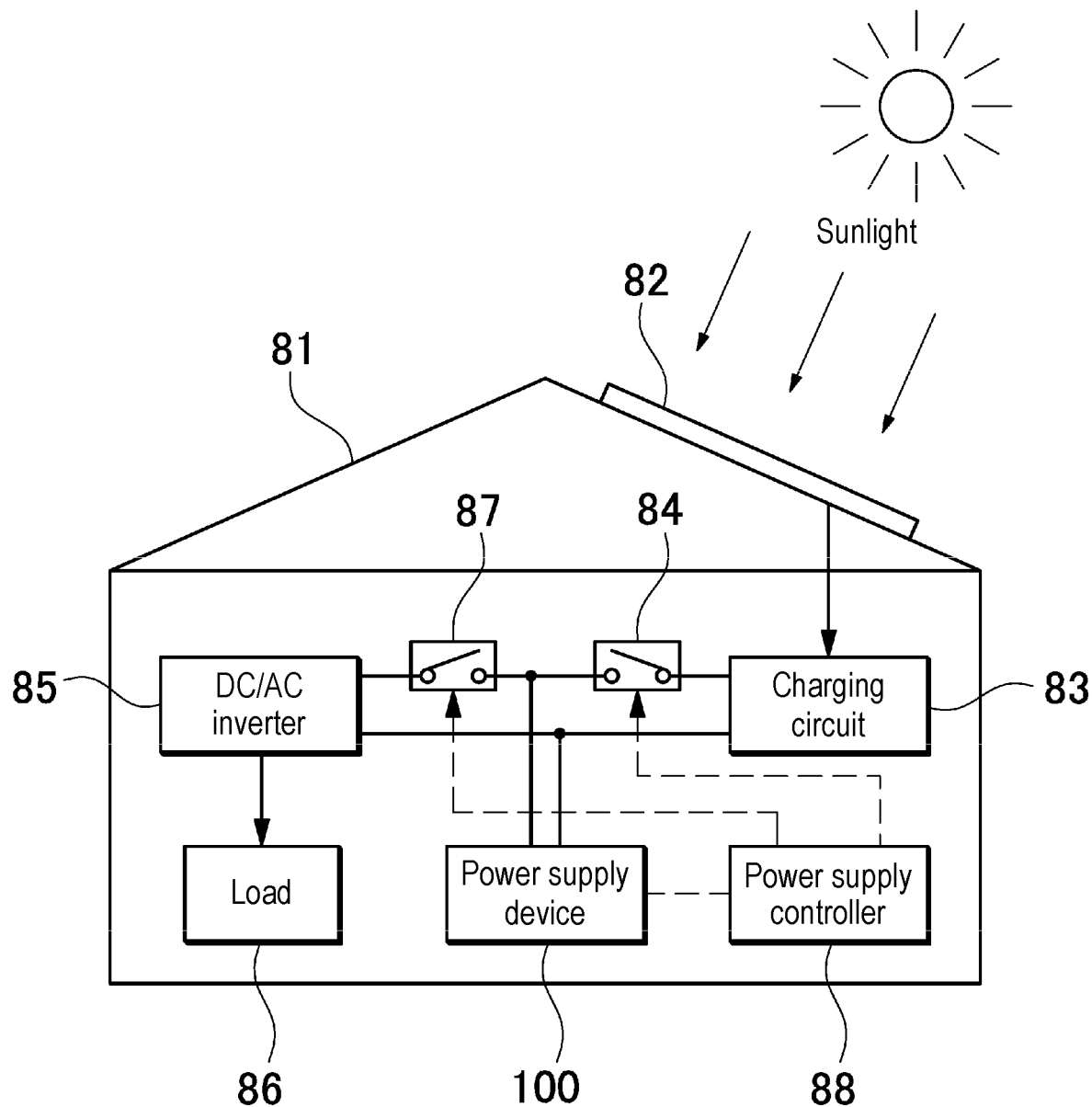
FIG. 16 is a block diagram illustrating an example where the present invention is applied to a power supply device for power storage.

In the present invention, the application of the power supply device is not limited to a power supply to a motor that allows a vehicle to travel. The power supply device according to the exemplary embodiment can also be used as a power supply of a power storage device that stores electricity by charging a battery with power generated by solar power generation, wind power generation, or the like. FIG. 16 illustrates a power storage device that stores electricity by charging the battery of power supply device 100 using solar cells 82.

The power storage device illustrated in FIG. 16 charges the battery of power supply device 100 with power generated by solar cells 82 disposed on a roof, a rooftop, or the like of building 81 such as a house or a factory. In this power storage device, the battery of power supply device 100 is charged by charging circuit 83 using solar cells 82 as a charging power source, and then power is supplied to load 86 via DC/AC inverter 85. Therefore, the power storage device has a charge mode and a discharge mode. In the power storage device illustrated in the drawing, DC/AC inverter 85 and charging circuit 83 are connected to power supply device 100 via discharging switch 87 and charging switch 84, respectively. ON/OFF of discharging switch 87 and charging switch 84 is switched by power supply controller 88 of the power storage device. In a charging mode, power supply controller 88 switches charging switch 84 to ON and switches discharging switch 87 to OFF to allow charging from charging circuit 83 to power supply device 100. In addition, when the charging is completed and the battery is fully charged, or in a state where a capacity equal to or larger than a predetermined value is charged, power supply controller 88 turns off charging switch 84 and turns on discharging switch 87 so as to switch an operation mode to a discharge mode, and power supply controller 88 allows power supply device 100 to discharge power to load 86. Further, when necessary, it is also possible to simultaneously perform supplying of power to load 86 and charging power supply device 100 by turning on charging switch 84 and turning on discharging switch 87.

Although not illustrated, the power supply device can also be used as a power supply of a power storage device that stores electricity by charging a battery using midnight power at night. The power supply device charged with the midnight power can be charged with midnight power that is surplus power generated by a power plant, outputs power in the daytime when a power load becomes large, and limits a peak power in the daytime to a small value. The power supply device can also be used as a power supply that is charged with both power from solar cells and midnight power. This power supply device can efficiently store electricity while considering weather and power consumption by effectively using both power generated by the solar cells and midnight power.

The power storage device described above can be suitably used for applications such as a backup power supply device that can be mounted on a rack of a computer server, a backup power supply device for a wireless base station of a mobile phone or the like, a power supply for power storage for home and factory use, a power storage device used by being combined with solar cells such as a power supply for street lamps, and a backup power supply for traffic lights and traffic indicators for roads.

INDUSTRIAL APPLICABILITY

The power supply device according to the present invention can be suitably used as a power supply for a large current used for a power supply of a motor that drives an electric vehicle such as a hybrid car, a plug-in hybrid car, an electric car, a fuel cell car, or an electric motorcycle. Examples of the power supply device according to the present invention include a power supply device for a plug-in hybrid electric car and a hybrid electric car capable of switching a traveling mode between an EV traveling mode and an HEV traveling mode, and a power supply device for a power supply device for an electric vehicle. In addition, the present invention can be appropriately used for applications such as a backup power supply device that can be mounted on a rack of a computer server, a backup power supply device for a wireless base station of a mobile phone or the like, a power supply for power storage for home and factory use, a power storage device used by being combined with solar cells such as a power supply for street lamps, and a backup power supply for traffic lights and traffic indicators for roads.

REFERENCE MARKS IN THE DRAWINGS

100: power supply device
1: battery cell
1X: terminal surface
1a: exterior can
1b: sealing plate
2: electrode terminal
2a: protruding portion
2b: welding surface
3, 3A, 3B, 3C, 3D, 3E, 3F, 3G, 3H: bus bar
4, 4A, 4B, 4C, 4D, 4E, 4F: rod portion
4a, 4b, 4c: cylindrical portion
4d, 4e: columnar portion
4s: slit
4x: horizontal surface
4y: vertical surface
5, 5A, 5B: arm portion
5a: connecting arm portion
5b: horizontal arm portion
5c: vertical arm portion
5d: welding portion
5x: distal end portion
5y: rear end portion
6: deformation gap
7: metal plate
7A: quadrangular region
10: battery stack
13: fixing component
14: end plate
15: fastening member
16: insulating spacer
17: end surface spacer
18: insulating material
81: building
82: solar cell
83: charging circuit
84: charging stitch
85: DC/AC inverter
86: load
87: discharging switch
88: power supply controller
91: vehicle body
93: motor
94: generator
95: DC/AC inverter
96: engine
97: wheel
98: charging plug
HV, EV: vehicle

The invention claimed is:
1. A power supply device comprising:
a bus bar electrically connecting a plurality of battery cells which are stacked, to each other,
wherein
the bus bar includes:
a rod including conductivity and extending in an arrangement direction of the plurality of battery cells; and
a plurality of arms being elastically deformable and being connected to the rod, each of the plurality of arms includes:
a distal end welded to an electrode terminal of a corresponding one of the plurality of battery cells; and
a rear end connected to the rod,
the arms electrically connect the plurality of battery cells to each other in parallel or in series via the rod,
each of the arms is a conductive plate that is elastically deformable, each of the arms includes a deformation gap between each of the arms and the rod, the deformation gap extending from the rear end towards the distal end, and each of the arms is elastically deformable to displace the distal end to be welded to the electrode terminal.

2. The power supply device according to claim 1, wherein the distal end of each of the arms is stacked on and welded to the electrode terminal.

3. The power supply device according to claim 1, wherein the deformation gap is disposed between each of the arms and the rod to allow displacement of the distal end of each of the arms in a vertical direction.

4. The power supply device according to claim 1, wherein the deformation gap is disposed between each of the arms and the rod to allow displacement of the distal end of each of the arms in a horizontal direction.

5. The power supply device according to claim 1, wherein the rod includes a polygonal columnar shape or a circular columnar shape.

6. The power supply device according to claim 1, wherein the rod includes a columnar shape including a vertical surface, and the rear end of each of the arms is connected to the vertical surface of the rod, and the deformation gap is disposed between each of the arms and the vertical surface of the rod.

7. The power supply device according to claim 1, wherein the rod includes a quadrangular columnar shape including a vertical surface and a horizontal surface, the arms include shapes extending along from the horizontal surface to the vertical surface of the rod, and a rear end of each of the arms is connected to the vertical surface of the rod, and the deformation gap is disposed between each of the arms and a horizontal portion of the rod.

8. The power supply device according to claim 1, wherein the rod is a columnar metal rod, and a rear end of each of the arms is welded and fixed to the rod portion.

9. The power supply device according to claim 1, wherein the rod includes:

a cylindrical portion a metal plate bended in a hollow columnar shape; and a columnar inserted into the cylindrical portion, and the arms are integrally connected to the metal plate.

10. The power supply device according to claim 1, wherein each of the plurality of battery cells is a quadrangular battery where an opening of an exterior can is closed by a sealing plate, and the plurality of battery cells are stacked to form a battery stack, positive and negative electrode terminals are disposed on the sealing plate, a pair of rods includes the rod, the pair of the rods is disposed outside the positive electrode terminal and the negative electrode terminal, the pair of the rods is disposed on an upper surface of the sealing plate in a state where the pair of the rods extends in the arrangement direction of the plurality of battery cells, and each of the arms extends from the rod to the electrode terminal, and the distal end is welded to the electrode terminal.

11. The power supply device according to claim 1, wherein the arms include:

a connecting arm disposed on a side surface of the rod and including the rear end that is connected to the rod;

a horizontal arm connected to an upper end of the connecting arm and extending toward a distal end over an upper surface of the rod;

a vertical arm including a plate shape and connected to a side edge of the horizontal arm; and a welding part connected horizontally to the vertical arm, and the welding part is welded to the electrode terminal in a stacked state.

12. The power supply device according to claim 1, wherein the arms include:

a connecting arm disposed on a side surface of the rod and including the rear end that is connected to the rod;

a horizontal arm connected to an upper end of the connecting arm and extending toward a distal end over an upper surface of the rod;

a vertical arm including a plate shape and connected to a distal end edge of the horizontal arm; and a welding connected horizontally to the vertical arm, and the welding is welded to the electrode terminal in a stacked state.

13. An electric vehicle including the power supply device according to claim 1, the electric vehicle comprising:

the power supply device;

a motor for traveling powered from the power supply device;

a vehicle body including the power supply device and the motor; and wheels that are driven by the motor to cause the vehicle body to travel.

14. A power storage device including the power supply device according to claim 1, the power storage device comprising:

the power supply device; and a power supply controller that controls charging and discharging of the power supply device, wherein the power supply controller enables a charge of the plurality of battery cells by power from an outside and controls charging of the plurality of battery cells.

15. A power supply device comprising:

a bus bar electrically connecting a plurality of battery cells to each other, wherein the bus bar includes:

a rod including conductivity and extending in an arrangement direction of the plurality of battery cells; and arms being elastically deformable and being connected to the rod, each of the arms includes:

a distal end welded to an electrode terminal of a corresponding one of the plurality of battery cells; and a rear end connected to the rod, the arms electrically connects the plurality of battery cells to each other via the rod, each of the arms is a conductive plate that is elastically deformable, each of the arms includes a deformation gap between each of the arms and the rod, the deformation gap extending from the rear end towards the distal end, and each of the arms is elastically deformable to displace the distal end to be welded to the electrode terminal, wherein the rear end of each of the arms is connected to a side surface of the rod that is a side surface opposite to the electrode terminal, and the deformation gap is disposed between each of the arms and the rod portion.

16. A power supply device comprising:
a bus bar electrically connecting a plurality of battery cells to each other, wherein the bus bar includes:
a rod including conductivity and extending in an arrangement direction of the plurality of battery cells; and arms being elastically deformable and being connected to the rod, each of the arms includes:
a distal end welded to an electrode terminal of a corresponding one of the plurality of battery cells; and
a rear end connected to the rod,
the arms electrically connects the plurality of battery cells to each other via the rod, each of the arms is a conductive plate that is elastically deformable, each of the arms includes a deformation gap between each of the arms and the rod, the deformation gap extending from the rear end towards the distal end, and each of the arms is elastically deformable to displace the distal end to be welded to the electrode terminal,
wherein the rod includes a metal plate winded and stacked in a spiral shape, and the arms are integrally connected to the metal plate.

17. The power supply device according to claim 16, wherein in a developed state, the metal plate is cut into a state where the metal plate includes:
a quadrangular region scheduled to form the rod and including a quadrangular profile; and
a plurality of the arms protruding from one side edge of the quadrangular region.

\* \* \* \* \*